(12) United States Patent
Matsumoto et al.

(10) Patent No.: US 6,449,316 B1
(45) Date of Patent: Sep. 10, 2002

(54) COMMUNICATION DEVICE AND INTERFERENCE REJECTION METHOD THEREIN

(75) Inventors: Wataru Matsumoto, Tokyo (JP); Masafumi Narikawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/693,848

(22) Filed: Oct. 23, 2000

Related U.S. Application Data

(63) Continuation of application No. PCT/JP00/00792, filed on Feb. 14, 2000.

(30) Foreign Application Priority Data

Feb. 24, 1999 (JP) .......................... 11-047144
Mar. 2, 1999 (JP) .......................... 11-054430
Apr. 26, 1999 (JP) .......................... 11-118011

(51) Int. Cl.[7] .............................................. H04L 1/00
(52) U.S. Cl. .................... 375/285; 375/349; 375/354; 370/201; 370/507; 370/517; 370/521
(58) Field of Search .................. 375/346, 354, 375/285, 349; 370/286, 201, 507, 517, 521

(56) References Cited

U.S. PATENT DOCUMENTS 5,991,311 A * 11/1999 Long et al. ................. 370/524
6,144,695 A * 11/2000 Helms et al. ................ 370/201
6,266,347 B1 * 7/2001 Amrany et al. ............. 370/286
2002/0001355 A1 * 6/2001 Tore .......................... 375/350

FOREIGN PATENT DOCUMENTS

JP 10303872 11/1998

OTHER PUBLICATIONS

Hiroshi Okado et al., "A Study on ADSL System for TCM–ISDN Crosstalk", Mar. 1998, p. 403 (with translation).

Nobukazu Koizumi et al., "An ADSL Transmission Technique under the TCM–ISDN Noise Environment", Sep.–Oct. 1998, p. 296 (with translation).

Nikkei BP Sha, "Nikkei Communications", Jul. 1998, pp. 92–97 (with translation).

Wataru Matsumoto et al., "Equalizer coefficient table switching in ADSL", Sep. 29–Oct. 2, 1988, p. 294, Proceedings of the 1988 Communications Society Conference of IECE, B–8–26.

* cited by examiner

*Primary Examiner*—Amanda T. Le

(57) ABSTRACT

All mutual interference occurring between TCM-ISDN and ADSL that communicate by utilizing a line having the same properties and using the same reference signal, and all mutual interference occurring between ADSLs are rejected, by delaying the TTR in the own ATU-C by $S_1$ and approximately adjusting the TTR transmitted to the ATU-R which is a device to be communicated by $S_2$.

44 Claims, 16 Drawing Sheets

FIG.11

| TTR | | | | | | | | | | | |
|---|---|---|---|---|---|---|---|---|---|---|---|
| 0 | 0 | 1 | 2 | 3 | 4 | 5 | 6 | 7 | 8 | 9 | |
| 1 | 10 | 11 | 12 | 13 | 14 | 15 | 16 | 17 | 18 | 19 | |
| 2 | 20 | 21 | 22 | 23 | 24 | 25 | 26 | 27 | 28 | 29 | |
| 3 | 30 | 31 | 32 | 33 | 34 | 35 | 36 | 37 | 38 | 39 | 40 |
| 0 | | 41 | 42 | 43 | 44 | 45 | 46 | 47 | 48 | 49 | 50 |
| 5 | | 51 | 52 | 53 | 54 | 55 | 56 | 57 | 58 | 59 | 60 |
| 6 | | 61 | 62 | 63 | 64 | 65 | 66 | 67 | 67 | 69 | 70 |
| 7 | | 71 | 72 | 73 | 74 | 75 | 76 | 77 | 78 | 79 | 80 |
| 8 | | 81 | 82 | 83 | 84 | 85 | 86 | 87 | 88 | 89 | 90 |
| 9 | | 91 | 92 | 93 | 94 | 95 | 96 | 97 | 98 | 99 | 100 | 101 |
| 10 | 101 | 102 | 103 | 104 | 105 | 106 | 107 | 108 | 109 | 110 | 111 |
| 11 | | 112 | 113 | 114 | 115 | 116 | 117 | 118 | 119 | 120 | 121 |
| 12 | | 122 | 123 | 124 | 125 | 126 | 127 | 128 | 129 | 130 | 131 |
| 13 | | 132 | 133 | 134 | 135 | 136 | 137 | 138 | 139 | 140 | 141 |
| 14 | | 142 | 143 | 144 | 145 | 146 | 147 | 148 | 149 | 150 | 151 |
| 15 | 152 | 153 | 154 | 155 | 156 | 157 | 158 | 159 | 160 | 161 | |
| 16 | 162 | 163 | 164 | 165 | 166 | 167 | 168 | 169 | 170 | 171 | 172 |
| 17 | | 173 | 174 | 175 | 176 | 177 | 178 | 179 | 180 | 181 | 182 |
| 18 | | 183 | 184 | 185 | 186 | 187 | 188 | 189 | 190 | 191 | 192 |
| 19 | | 193 | 194 | 195 | 196 | 197 | 198 | 199 | 200 | 201 | 202 |
| 20 | 203 | 204 | 205 | 206 | 207 | 208 | 209 | 210 | 211 | 212 | |
| 21 | | 213 | 214 | 215 | 216 | 217 | 218 | 219 | 220 | 221 | 222 |
| 22 | 223 | 224 | 225 | 226 | 227 | 228 | 229 | 230 | 231 | 232 | |
| 23 | 233 | 234 | 235 | 236 | 237 | 238 | 239 | 240 | 241 | 242 | 243 |
| 24 | | 244 | 245 | 246 | 247 | 248 | 249 | 250 | 251 | 252 | 253 |
| 25 | | 254 | 255 | 256 | 257 | 258 | 259 | 260 | 260 | 262 | 263 |
| 26 | | 264 | 265 | 266 | 267 | 268 | 269 | 270 | 271 | 272 | 273 |
| 27 | | 274 | 275 | 276 | 277 | 278 | 279 | 280 | 281 | 282 | 283 |
| 28 | 284 | 285 | 286 | 287 | 288 | 289 | 290 | 291 | 292 | 293 | |
| 29 | 294 | 295 | 296 | 297 | 298 | 299 | 300 | 301 | 302 | 303 | |
| 30 | 304 | 305 | 306 | 307 | 308 | 309 | 310 | 311 | 312 | 313 | 314 |
| 31 | | 315 | 316 | 317 | 318 | 319 | 320 | 321 | 322 | 323 | 324 |
| 32 | | 325 | 326 | 327 | 328 | 329 | 330 | 331 | 332 | 333 | 334 |
| 33 | | 335 | 336 | 337 | 338 | 339 | 340 | 341 | 342 | 343 | 344 |

FIG.12

| TTR | | | | | | | | | | | |
|---|---|---|---|---|---|---|---|---|---|---|---|
| 0 | 0 | 1 | 2 | 3 | 4 | 5 | 6 | 7 | 8 | 9 | |
| 1 | 10 | 11 | 12 | 13 | 14 | 15 | 16 | 17 | 18 | 19 | |
| 2 | 20 | 21 | 22 | 23 | 24 | 25 | 26 | 27 | 28 | 29 | |
| 3 | 30 | 31 | 32 | 33 | 34 | 35 | 36 | 37 | 38 | 39 | 40 |
| 0 | | 41 | 42 | 43 | 44 | 45 | 46 | 47 | 48 | 49 | 50 |
| 5 | | 51 | 52 | 53 | 54 | 55 | 56 | 57 | 58 | 59 | 60 |
| 6 | | 61 | 62 | 63 | 64 | 65 | 66 | 67 | 68 | 69 | 70 |
| 7 | | 71 | 72 | 73 | 74 | 75 | 76 | 77 | 78 | 79 | 80 |
| 8 | | 81 | 82 | 83 | 84 | 85 | 86 | 87 | 88 | 89 | 90 |
| 9 | | 91 | 92 | 93 | 94 | 95 | 96 | 97 | 98 | 99 | 100 | 101 |
| 10 | 101 | 102 | 103 | 104 | 105 | 106 | 107 | 108 | 109 | 110 | 111 |
| 11 | | 112 | 113 | 114 | 115 | 116 | 117 | 118 | 119 | 120 | 121 |
| 12 | | 122 | 123 | 124 | 125 | 126 | 127 | 128 | 129 | 130 | 131 |
| 13 | | 132 | 133 | 134 | 135 | 136 | 137 | 138 | 139 | 140 | 141 |
| 14 | | 142 | 143 | 144 | 145 | 146 | 147 | 148 | 149 | 150 | 151 |
| 15 | | 152 | 153 | 154 | 155 | 156 | 157 | 158 | 159 | 160 | 161 |
| 16 | 162 | 163 | 164 | 165 | 166 | 167 | 168 | 169 | 170 | 171 | 172 |
| 17 | | 173 | 174 | 175 | 176 | 177 | 178 | 179 | 180 | 181 | 182 |
| 18 | | 183 | 184 | 185 | 186 | 187 | 188 | 189 | 190 | 191 | 192 |
| 19 | | 193 | 194 | 195 | 196 | 197 | 198 | 199 | 200 | 201 | 202 |
| 20 | | 203 | 204 | 205 | 206 | 207 | 208 | 209 | 210 | 211 | 212 |
| 21 | | 213 | 214 | 215 | 216 | 217 | 218 | 219 | 220 | 221 | 222 |
| 22 | 223 | 224 | 225 | 226 | 227 | 228 | 229 | 230 | 231 | 232 | |
| 23 | 233 | 234 | 235 | 236 | 237 | 238 | 239 | 240 | 241 | 242 | 243 |
| 24 | | 244 | 245 | 246 | 247 | 248 | 249 | 250 | 251 | 252 | 253 |
| 25 | | 254 | 255 | 256 | 257 | 258 | 259 | 260 | 260 | 262 | 263 |
| 26 | | 264 | 265 | 266 | 267 | 268 | 269 | 270 | 271 | 272 | 273 |
| 27 | | 274 | 275 | 276 | 277 | 278 | 279 | 280 | 281 | 282 | 283 |
| 28 | | 284 | 285 | 286 | 287 | 288 | 289 | 290 | 291 | 292 | 293 |
| 29 | 294 | 295 | 296 | 297 | 298 | 299 | 300 | 301 | 302 | 303 | |
| 30 | 304 | 305 | 306 | 307 | 308 | 309 | 310 | 311 | 312 | 313 | 314 |
| 31 | | 315 | 316 | 317 | 318 | 319 | 320 | 321 | 322 | 323 | 324 |
| 32 | | 325 | 326 | 327 | 328 | 329 | 330 | 331 | 332 | 333 | 334 |
| 33 | | 335 | 336 | 337 | 338 | 339 | 340 | 341 | 342 | 343 | 344 |

COMMUNICATION DEVICE AND INTERFERENCE REJECTION METHOD THEREIN

This application is a Continuation of PCT International Application No. PCT/JP00/00792 filed on Feb. 14, 2000, which designated the United States, and on which priority is claimed under 35 U.S.C. §120, the entire contents of which are hereby incorporated by reference.

TECHNICAL FIELD

The present invention relates to a communication device for performing data communication by means of a DMT (discrete multi tone) data set method between communication devices. In particular, this invention relates to a communication device that performs interference rejection between TCM (Time Compression Multiplexing: time-shared transmission method)—ISDN and ADSL, or between ADSL and ADSL, relative to each other, and also relates to interference rejection method thereof.

BACKGROUND ART

A conventional communication device will first be described. At first, in a conventional communication device for performing data communication by means of a DMT (Discrete Multi Tone) data set method, the operation of a transmission system will be described briefly. For example, when data communication is to be performed with the DMT data set method, using an existing transmission line such as a telephone line or the like, in the transmission system, there is performed a tone ordering processing (thereby, the transmission rate is determined), that is, a processing for allocating transmission data having number of bits that can be transmitted, respectively, to a plurality of tones (multi carrier) of a frequency band set in advance based on a S/N ratio (signal-to-noise ratio). Specifically, for example, transmission data having number of bits corresponding to the respective S/N ratio are allocated to tones of from tone 0 to tone X (X is an integer showing the number of tones) in each frequency.

The transmission data are then multiplexed for each frame, by performing the tone ordering processing corresponding to the S/N ratio and a coding processing. Moreover, in the transmission system, inverse fast Fourier transform (IFFT) is performed with respect to the multiplexed transmission data, to convert parallel data after the inverse fast Fourier transform to serial data, and thereafter, the digital waveform is converted to the analog waveform through a D/A converter, which is finally subjected to a low-pass filter, and the transmission data is transmitted on the telephone line.

Operation of a reception system in a conventional communication device that performs data communication by means of a DMT data set method will now be described briefly. Similarly to the above case, when data communication is to be performed with the DMT data set method, using an existing transmission line such as a telephone line or the like, in the reception system, the received data (the above-described transmission data) is subjected to a low-pass filter, and thereafter, the analog waveform is converted to the digital waveform through an A/D converter, and an adaptive equalization processing of time domain is performed by a time domain equalizer.

The data subjected to the time domain adaptive equalization processing is converted from serial data to parallel data, which is then subjected to the fast Fourier transform. Thereafter, an adaptive equalization processing of frequency domain is performed by a frequency domain equalizer.

The data subjected to the frequency domain adaptive equalization processing is converted to serial data through a complex processing (complex method of maximum likelihood) and the tone ordering processing, and thereafter, processing such as rate convert processing, FEC (forward error correction), de-scramble processing, CRC (cyclic redundancy check) or the like is performed, to finally reproduce the transmission data.

As a wire system digital communication method that performs data communication using the above-described DMT data set method, there can be mentioned an XDSL communication method such as an ADSL (Asymmetric Digital Subscriber Line) communication method that performs high speed digital communication at several megabits per second, using an existing telephone line. This method is standardized in ANSI, T1.413 or the like. With this digital communication method, in particular, the ADSL transmission line and the ISDN transmission line in the ISDN communication system of a half duplex communication method are tied up at an aggregate line on the way and adjacent to each other. The ISDN communication system referred herein is a method heretofore adopted in NTT, for example, the TCM-ISDN service, which service is generally referred to as a ping-pong method.

FIG. 9 shows a signal flow in the TCM-ISDN service heretofore serviced by NTT. With this service, for example as shown in FIG. 9, ISDN-DS (Downstream) is transmitted from OCU (Office Channel Unit), that is, a base station, and the ISDN-DS is received by DSU (Digital Service Unit), that is, by a reception device side. Then, on the reception device side, after 7 UI (1 UI: 3.125 $\mu$s) since having completed reception, ISDN-US (Upstream) is transmitted, and the ISDN-US is received by the base station side.

Specifically, with the above DSU, for example as shown in FIG. 9, a delay corresponding to the distance with OCU exists in the ISDN service. For example, if the distance between OCU and DSU is a short distance (here, a distance 0 is shown), there is no delay, and upon transmission of ISDN-DS by the OCU, the DSU receives the ISDN-DS. Moreover, ISDN-US transmitted from the DSU after 7 UI is transmitted to the OCU without any delay. On the other hand, if the distance between the OCU and the DSU is a long distance (here, a long distance limit is shown), when the OCU transmits ISDN-DS, the DSU receives the ISDN-DS after a predetermined delay time has passed. Moreover, ISDN-US transmitted from the DSU after 7 UI is transmitted to the OCU after a predetermined delay time has passed. Here, TTR (TCM-ISDN Timing Reference) shown in the figure is a signal serving as a reference for synchronization in the downstream and upstream on the network, and in the TCM-ISDN, this timing may be known only in the base station. Furthermore, one cycle of TTR is designated herein as, for example, 2.5 ms.

On the other hand, the ADSL transmission line is tied up with and adjacent to the above-described TCM-ISDN transmission line of the half duplex communication method at an aggregate line on the way. Hence, without timing adjustment between the ADSL and the TCM-ISDN, the TCM-ISDN signal becomes interference signal, thereby causing deterioration in the communication characteristic in the ADSL. That is to say, as shown in FIG. 10, NEXT (Near End Cross Talk) noise and FEXT (Far End Cross Talk) noise occur, causing deterioration in the communication characteristic in the ADSL.

Accordingly, in the ADSL service, as shown in FIG. 11 and FIG. 12, a boundary (dotted line shown in the figure) is provided, taking the delay into consideration, so as to be downstream at the time of DS of the TCM-ISDN, and to be upstream at the time of US of the TCM-ISDN. Here, FIG. 11 and FIG. 12 show a hyper-frame symbol form in the ADSL, respectively, and constitutes one hyper frame with, for example, 345 symbols. One hyper frame is designated herein as 85 ms, and this value is a multiple of TTR (2.5 ms) described above. Also, in FIG. 11 and FIG. 12, an example of a hyper frame including a cyclic prefix is shown, but similar operation is possible even in a hyper frame including no cyclic prefix. In this case, however, one hyper frame (345 symbols) becomes 80 ms.

Furthermore, a netted portion in FIG. 11 is referred to as $FEXT_R$ data symbol (indicating the time when the reception device side is in the FEXT period), and other data is referred to as $NEXT_R$ data symbol (indicating the time when the reception device side is in the NEXT period). Also, a netted portion in FIG. 12 is referred to as $FEXT_c$ data symbol (indicating the time when the base station side is in the FEXT period), and other data is referred to as $NEXT_c$ data symbol (indicating the time when the base station side is in the NEXT period).

Specifically, FEXT-DS transmission is performed by the ATU-C at the time of ISDN-DS transmission by means of the OCU, and FEXT-US transmission is performed by the ATU-R at the time of ISDN-US transmission by means of the DSU.

As a result, a conventional ADSL communication device is not affected by interference due to DS and US in the TCM-ISDN, and hence, communication characteristic is not deteriorated due to the TCM-ISDN.

However, with the above-described conventional communication device, influence of interference given by the ADSL to the TCM-ISDN and interference between ADSLs have not been considered.

At first, interference given by the ADSL to the TCM-ISDN will be specifically described. For example, as shown in FIG. 9, when the distance between the OCU and the DSU is "0", since there is no delay, the transfer timing of ISDN-DS and the transfer timing of ISDN-US agree with each other, respectively, at a point of $\hat{1}$ and at a point of $\hat{3}$. However, when the distance between the OCU and the DSU is a "long distance limit", ISDN-DS is received delayed by 16 UI (50 µs: between $\hat{1}$ and $\hat{2}$ in FIG. 1), and ISDN-US arrives similarly delayed by 16 UI (between $\hat{3}$ and $\hat{4}$ in FIG. 1). As a result, delay of 32 UI in total will occur. At this time, the ISDN-US reception in the OCU will exceed the boundary $\hat{5}$ in the NEXT period.

Hence, the $FEXT_R$ data symbols (for example, symbol number 10, 81, 142, 213, 284) from the ATU-C enclosed by a circle shown in FIG. 11 become interference components (NEXT noise) with respect to the OCU in the TCM-ISDN, causing deterioration in the communication characteristic in the ISDN service. That is to say, there is such a problem in that reception by the OCU may be affected by interference due to the FEXT-DS transmission by the ATU-C.

Next, interference between ADSLs will be specifically described. For example, in the ADSL, the ATU-C is transmitting TTR to the ATU-R, as shown in FIG. 13. Therefore, the TTR held by the ATU-R will have a delay of maximum 20 UI (the delay becomes 20 UI, taking into consideration a margin with respect to the maximum delay time, 16 UI of the TCM-ISDN, but since the TCM-ISDN and the ADSL use substantially the same transmission line, the actual maximum delay time becomes 16 UI) depending on the distance of the transmission line. In this case, if it is assumed that the TTR of the ATU-R has a delay of 20 UI, the FEXT-US reception from the ATU-R that operates synchronously thereto will have a delay of not exceeding 40 UI.

At this time, in other ATU-Cs and its own ATU-C where hyper-frame synchronization is performed, for example, even in a case of symbol No. 81 shown in FIG. 11, since symbols up to symbol No. 79 are FEXT-US transmission, as seen from FIG. 12, interference will not occur even if the FEXT-US transmission is delayed by 40 UI at maximum. However, in other ATU-Cs where hyper-frame synchronization is not performed, the FEXT-DS transmission of the symbol No. 81 shown in the above FIG. 11 becomes interference in the FEXT-US reception just at the boundary, such as a symbol No. 39. That is to say, there is a problem in that the FEXT-DS transmission of the ATU-C becomes the NEXT noise with respect to the FEXT-US reception of other ATU-Cs.

Accordingly, in view of the above situation, it is an object of the present invention to provide a communication device that can perform interference rejection between the TCM-ISDN and ADSL, or between ADSLs relative to each other, and also provide an interference rejection method thereof.

DISCLOSURE OF THE INVENTION

With a communication device according to the present invention, it is characterized in that the communication device has a reference signal for synchronization with regard to the downstream and upstream, and performs data communication by means of the ADSL, by transmitting the reference signal to a device to be communicated to thereby establish mutual synchronization, the reference signal in its own communication device is delayed by a first predetermined time and a reference signal to be transmitted to the device to be communicated is approximately adjusted by a second predetermined time, to thereby reject all mutual interference occurring between other communication systems that communicate by utilizing a line having the same properties and using the same reference signal, and the ADSL, and all mutual interference occurring between ADSLs.

According to this invention, for example, the own communication device (ATU-C) shifts TTR (reference signal) in the own ATU-C by $S_1$ (first predetermined time), so that FEXT-DS in the ATU-C is not involved in the ISDN-US reception of the ISDN (other communication system). Moreover, the ATU-C transmits its TTR to the ATU-R (a device to be communicated), with a variable delay $S_2$ (second predetermined time) corresponding to the distance with the ATU-R added to the inside TTR delayed by $S_1$ previously. That is to say, $S_2$ is adjusted so that the FEXT-DS transmission of the ATU-C does not become interference in the FEXT-US reception of other ATU-C that is not synchronized therewith (hyper-frame synchronization). As a result, all the interference between the ADSL and the ISDN and between ADSLs relative to each other can be rejected.

With a communication device according to the next invention, it is characterized in that an allowable range of the first predetermined time is calculated based on a relational expression between a communication device on the transmission side and a communication device on the reception side where interference occurs most likely, and a value which maximizes the margin of the allowable range is fixed as the first predetermined time.

According to this invention, the first predetermined time is calculated using a relational expression at a point where interference occurs most likely under conditions of the maximum transmission line delay, that is, where the margin is smallest in the relational expression. As a result, a relational expression between devices having other conditions, for example, less possibility of interference can be easily compensated.

With a communication device according to the next invention, it is characterized in that an allowable range of the second predetermined time is calculated corresponding to the compensated range of the transmission line delay, based on a relational expression between all communication devices on the transmission side and all communication devices on the reception side, having a possibility that interference may occur, and the first predetermined time, and a value that always maximizes the margin is calculated, corresponding to a variation in the transmission line delay, and the calculated value is designated as the second predetermined time.

According to this invention, $S_1$ (first predetermined time) and $S_2$ (second predetermined time) can be uniquely calculated respectively from one corresponding relational expression, and in the ADSL, TTR (reference signal) is shifted by $S_1$ and $S_2$ calculated herein. As a result, all the interference between the ADSL and the ISDN and between ADSLs relative to each other can be rejected.

With a communication device according to the next invention, it is characterized in that an allowable range of the second predetermined time is calculated corresponding to the compensated range of the transmission line delay, based on a relational expression between all communication devices on the transmission side and all communication devices on the reception side, having a possibility that interference may occur, and the first predetermined time, so that even if the transmission line delay varies, the second predetermined time is fixed within the allowable range of the second predetermined time.

According to this invention, $S_2$ (second predetermined time) is fixed in advance to a value satisfying the allowable range. As a result, the interference in the ISDN due to the ADSL and interference between ADSLs relative to each other can be rejected, and further, $S_2$ can be fixed to a plurality of values. Hence, since it is not necessary to determine $S_2$ by calculation of a relational expression, calculation amount decreases, thereby facilitating high speep processing. In addition, $S_2$ can be fixed to one by designating $S_2$ that is a relatively rare case in communication (a value close to the maximum value and the minimum value in the allowable range) as an optional function, thereby further decreasing the calculation amount and facilitating high speed processing.

With a communication device according to the next invention, it is characterized in that before establishing communication between devices in the ADSL, measurement of the transmission line delay between the devices and calculation of the first predetermined time and the second predetermined time are performed, thereby establishing communication without having any interference.

According to this invention, before the ATU-C and the ATU-R establish hyper-frame synchronization, the ATU-C calculates the transmission line delay. As a result, $S_1$ (first predetermined time) and $S_2$ (second predetermined time) for delaying the TTR (reference signal) can be easily calculated, hence enabling establishment of communication without having any interference.

With a communication device according to the next invention, it is characterized in that the transmission line delay is calculated based on round trip time of a certain signal between the devices.

According to this invention, since RTD (round trip time of a certain signal) is measured, the calculation becomes very easy, thereby reducing the processing time by the ATU-R. Moreover, for example, by communicating at the double frequency on the return trip, the frequency does not overlap in the first half and the second half, hence the ATU-C can easily recognize a signal from the ATU-R.

With interference rejection method according to the next invention, a reference signal in its own communication device is delayed by a first predetermined time and a reference signal to be transmitted to a device to be communicated is approximately adjusted by a second predetermined time, to thereby reject all mutual interference occurring between other communication systems that communicate by utilizing a line having the same properties, and using the same reference signal, and the ADSL, and all mutual interference occurring between ADSLS.

According to this invention, for example, the own communication device (ATU-C) shifts TTR (reference signal) in the own ATU-C by $S_1$ (first predetermined time), so that FEXT-DS in the ATU-C is not involved in the ISDN-US reception of the ISDN (other communication system). Moreover, the ATU-C transmits its TTR to the ATU-R (a device to be communicated), with a variable delay $S_2$ (second predetermined time) corresponding to the distance with the ATU-R added to the inside TTR delayed by $S_1$ previously. That is to say, $S_2$ is adjusted so that the FEXT-DS transmission of the ATU-C does not become interference in the FEXT-US reception of other ATU-C that is not synchronized therewith (hyper-frame synchronization). As a result, all the interference between the ADSL and the ISDN and between ADSLs relative to each other can be rejected.

With an interference rejection method according to the next invention, it is characterized in that an allowable range of the first predetermined time is calculated based on a relational expression between a communication device on the transmission side and a communication device on the reception side where interference occurs most likely, and a value which maximizes the margin of the allowable range is fixed as the first predetermined time.

According to this invention, the first predetermined time is calculated using a relational expression at a point where interference occurs most likely under conditions of the maximum transmission line delay, that is, where the margin is smallest in the relational expression. As a result, a relational expression between devices having other conditions, for example, less possibility of interference can be easily compensated.

With an interference rejection method according to the next invention, it is characterized in that an allowable range of the second predetermined time is calculated corresponding to the compensated range of the transmission line delay, based on a relational expression between all communication devices on the transmission side and all communication devices on the reception side, having a possibility that interference may occur, and the first predetermined time, and a value that always maximizes the margin is calculated, corresponding to a variation in the transmission line delay, and the calculated value is designated as the second predetermined time.

According to this invention, $S_1$ (first predetermined time) and $S_2$ (second predetermined time) can be uniquely calculated respectively from one corresponding relational expression, and in the ADSL, TTR (reference signal) is shifted by $S_1$ and $S_2$ calculated herein. As a result, all the interference between the ADSL and the ISDN and between ADSLs relative to each other can be rejected.

With an interference rejection method according to the next invention, it is characterized in that an allowable range of the second predetermined time is calculated corresponding to the compensated range of the transmission line delay, based on a relational expression between all communication devices on the transmission side and all communication devices on the reception side, having a possibility that interference may occur, and the first predetermined time, so that even if the transmission line delay varies, the second predetermined time is fixed within the allowable range of the second predetermined time.

According to this invention, $S_2$ (second predetermined time) is fixed in advance to a value satisfying the allowable range. As a result, the interference in the ISDN due to the ADSL and interference between ADSLs relative to each other can be rejected, and further, $S_2$ can be fixed to a plurality of values. Hence, since it is not necessary to determine $S_2$ by calculation of a relational expression, calculation amount decreases, thereby facilitating high speed processing. In addition, $S_2$ can be fixed to one by designating $S_2$ that is a relatively rare case in communication (a value close to the maximum value and the minimum value in the allowable range) as an optional function, thereby further decreasing the calculation amount and facilitating high speed processing.

With an interference rejection method according to the next invention, it is characterized in that before establishing communication between devices in the ADSL, measurement of the transmission line delay between the devices and calculation of the first predetermined time and the second predetermined time are performed, thereby establishing communication without having any interference.

According to this invention, before the ATU-C and ATU-R establish hyper-frame synchronization, the ATU-C calculates the transmission line delay. As a result, $S_1$ (first predetermined time) and $S_2$ (second predetermined time) for delaying the TTR (reference signal) can be easily calculated, hence enabling establishment of communication without having any interference.

With an interference rejection method according to the next invention, it is characterized in that the transmission line delay is calculated based on round trip time of a certain signal between the devices.

According to this invention, since RTD (round trip time of a certain signal) is measured, the calculation becomes very easy, thereby reducing the processing time by the ATU-R. Moreover, for example, by communicating at the double frequency on the return trip, the frequency does not overlap in the first half and the second half, hence the ATU-C can easily recognize a signal from the ATU-R.

With an interference rejection method according to the next invention, it is characterized in that an allowable range of the first predetermined time is calculated based on a relational expression between a communication device on the transmission side and a communication device on the reception side where interference occurs most likely, and a value which maximizes the margin of the allowable range is fixed as the first predetermined time, the fixed first predetermined time being substituted in all the aforementioned relational expressions, and in this state, an allowable range of the second predetermined time is calculated based on a relational expression between a communication device on the transmission side and a communication device on the reception side where interference occurs most likely, and a value which maximizes the margin of the allowable range is fixed as the second predetermined time.

According to this invention, the first predetermined time and the second predetermined time are calculated without relying on conditions of the transmission line delay, using a relational expression where interference occurs most likely, that is, the margin is smallest in the relational expression. As a result, a relational expression between devices having other conditions, for example, less possibility of interference can be easily compensated. Moreover, since the first predetermined time and the second predetermined time are fixed values, it is not necessary to change the value every time depending on the conditions of the transmission line delay or the like, hence the calculation amount of each device can be reduced.

With an interference rejection method according to the next invention, it is characterized in that an allowable range of the first predetermined time is calculated based on a relational expression between a communication device on the transmission side and a communication device on the reception side where interference occurs most likely, and a value which maximizes the margin of the allowable range is fixed as the first predetermined time, the fixed first predetermined time being substituted in all the aforementioned relational expressions, and in this state, an allowable range of the second predetermined time is calculated based on a relational expression between a communication device on the transmission side and a communication device on the reception side where interference occurs most likely, and a value which maximizes the margin of the allowable range is fixed as the second predetermined time.

According to this invention, the first predetermined time and the second predetermined time are calculated without relying on conditions of transmission line delay, using a relational expression where interference occurs most likely, that is, the margin is smallest in the relational expression. As a result, a relational expression between devices having other conditions, for example, less possibility of interference can be easily compensated. Moreover, since the first predetermined time and the second predetermined time are fixed values, it is not necessary to change the value every time depending on the conditions of the transmission line delay or the like, hence the calculation amount of each device can be reduced.

With a communication device according to the next invention, it is characterized in that a delay resulting from the internal processing in communication devices on the transmission side and the reception side, and predetermined conditions for protecting the other communication systems from interference more strictly are newly added to the relational expression, and based on the relational expression reflecting these conditions, the first predetermined time and the second predetermined time are calculated.

According to this invention, the communication device calculates the first predetermined time and the second predetermined time, by adding new conditions to the relational expression, for example, a loop timing margin, a system margin, a guard interval in the ISDN, a condition for inhibiting transfers spanning the TTR cycle or the like. As a result, more precise first predetermined time and second predetermined time can be calculated, thereby enabling interference rejection between devices with higher precision.

With an interference rejection method according to the next invention, it is characterized in that a delay resulting from the internal processing in communication devices on the transmission side and the reception side, and predetermined conditions for protecting the other communication systems from interference more strictly are newly added to the relational expression, and based on the relational expression, reflecting these conditions, the first predetermined time and the second predetermined time are calculated.

According to this invention, the first predetermined time and the second predetermined time are calculated based on a relational expression obtained by adding new condition, for example, a loop timing margin, a system margin, a guard interval in the ISDN, a condition for inhibiting transfers spanning the TTR cycle or the like. As a result, more precise first predetermined time and second predetermined time can be calculated, thereby enabling interference rejection between devices with higher precision.

BRIEF DESCRIPTION OF THE DRAWINGS

FIG. 11 is a diagram showing a symbol form of a hyper frame in the ADSL;

FIG. 12 is a diagram showing a symbol form of a hyper frame in the ADSL;

BEST MODE FOR CARRYING OUT THE INVENTION

Preferred embodiments of a communication device and an interference rejection method thereof according to the present invention will now be described in detail, with reference to drawings. However, the present invention is not limited to these embodiments.

Figure 1:
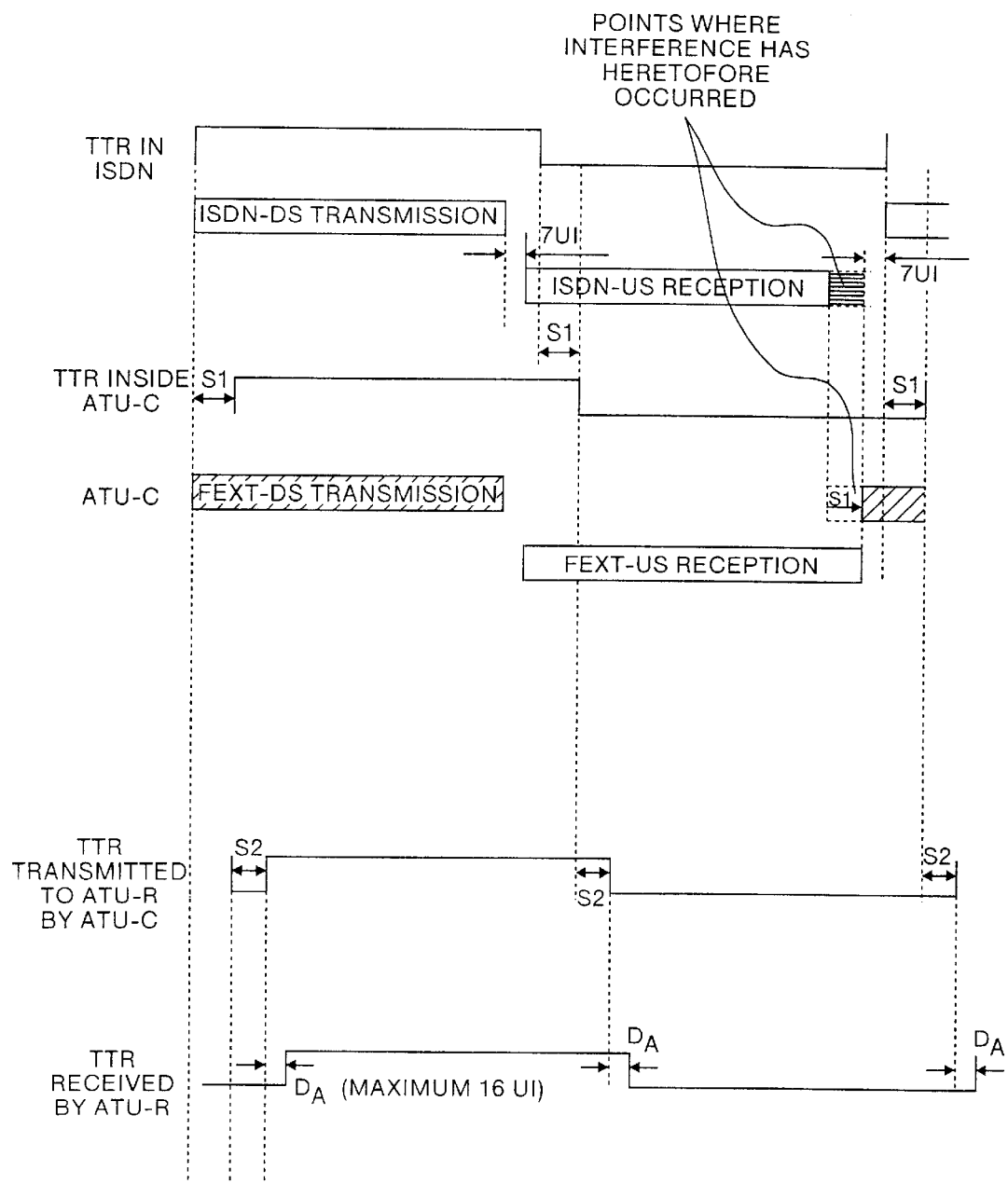
FIG. 1 is a diagram showing the outline of an interference rejection method according to the present invention.

FIG. 1 is a diagram showing an outline of an interference rejection method according to the present invention. Here, a basic operation of the communication device which performs the interference rejection method of the present invention will first be described with reference to drawings. As a wire system digital communication method that performs data communication using the DMT (Discrete Multi Tone) data set method, there can be mentioned an XDSL communication method, such as an ADSL (Asymmetrical Digital Subscriber Line) communication method that performs fast digital communication at several megabits per second, using an existing telephone line, and a HDSL (high-bit-rate Digital Subscriber Line) communication method. This method is standardized in ANSI, T1.413 or the like. With this digital communication method, in particular, the ADSL transmission line and the ISDN transmission line in the TCM-ISDN communication system of a half duplex communication method are tied up at an aggregate line on the way and adjacent to each other. Therefore, in at least one of the ADSL and TCM-ISDN, it is necessary to provide a measure for performing interference rejection due to the adjacent transmission lines.

Figure 2:
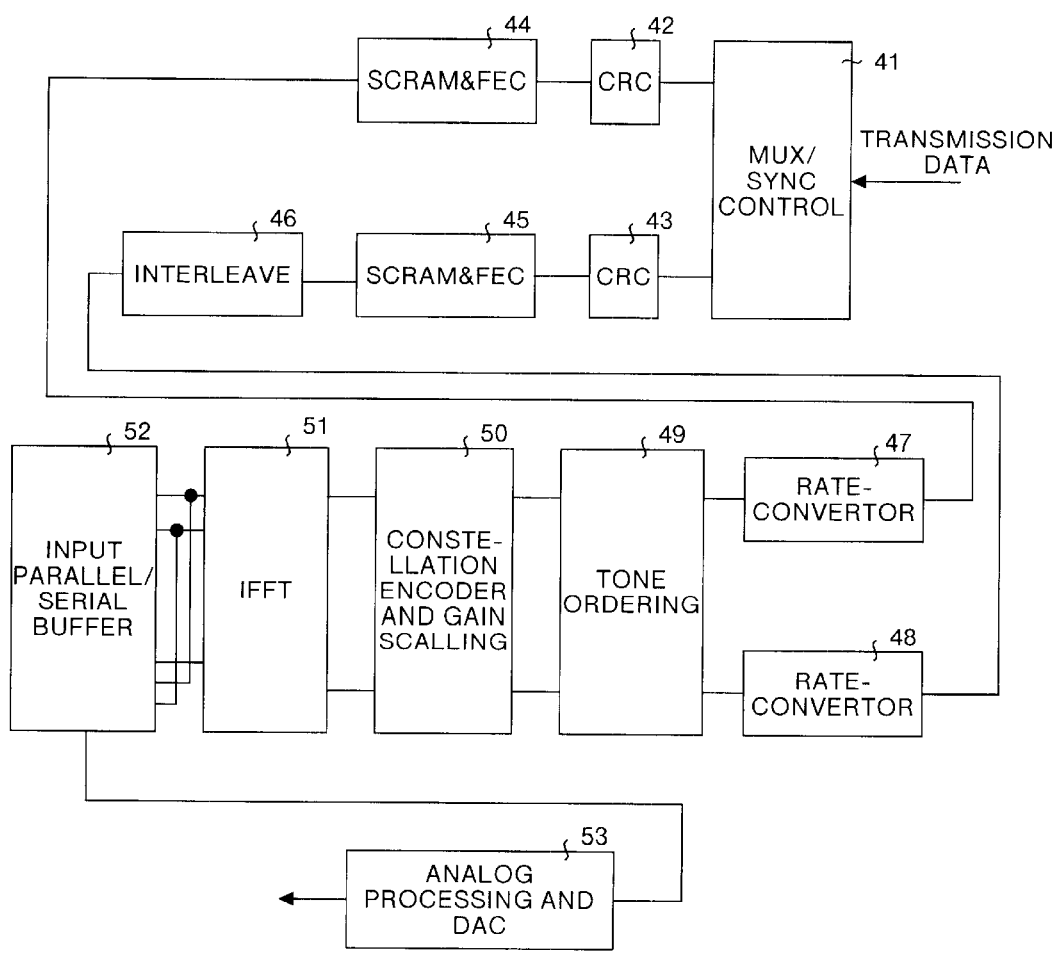
FIG. 2 is a diagram showing a construction of a transmission system of a communication device according to the present invention.

FIG. 2 is a diagram showing a construction of a transmission system of the communication device according to the present invention, and for example, showing a construction of an ATU-C transmission system. In addition, a construction of an ATU-R transmission system is similar. In FIG. 2, with the ATU-C transmission system, the transmission data is multiplexed by a multiplex/sync control (corresponding to MUX/SYNC CONTROL shown in the figure), error detection code is added to the multiplexed transmission data in cyclic redundancy check (corresponding to CRC) 42, 43, and addition of a code for FEC and a scramble processing are performed in forward error correction (corresponding to SCRAM & FEC) 44, 45.

There are two routes from the multiplex/sync control 41 getting to tone ordering 49, one is an interleaved data buffer route including an interleave 46, and the other is a fast data buffer route without including the interleave 46. Delay in the interleaved data buffer route becomes larger than that of the fast data buffer route.

Thereafter, the transmission data is subjected to a rate converting processing by means of a rate converter (corresponding to RATE-CONVERTOR) 47, 48, and then to a tone ordering processing in the tone ordering (TONE ORDERING) 49. Then, based on the transmission data that has undergone tone ordering, constellation data is formed in a constellation encoder and gain scaling (corresponding to CONSTELLATION AND GAIN SCALING) 50, and the formed data is subjected to inverse fast Fourier transform in an inverse fast Fourier transform section (corresponding to IFFT: Inverse Fast Fourier transform) 51.

Finally, parallel data after having been subjected to the Fourier transform is converted to serial data in an input parallel/serial buffer (corresponding to INPUT PARALLEL/SERIAL BUFFER) 52, to convert the digital waveform to the analog waveform through a D/A converter in an analog processing and DAC (corresponding to ANALOG PROCESSING AND DAC) 53, which is then subjected to a low-pass filter to thereby transmit the transmission data on the telephone line.

Figure 3:
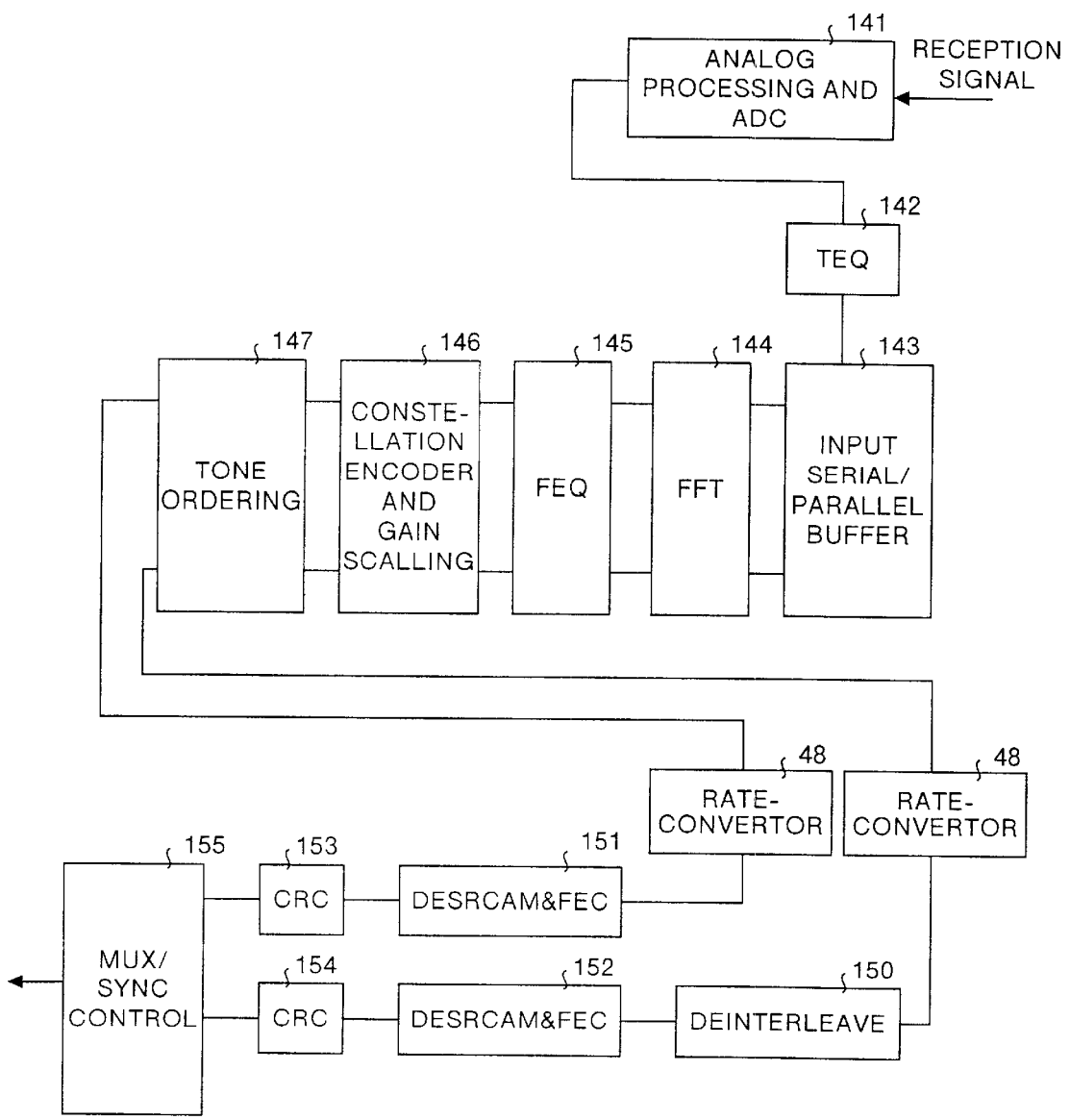
FIG. 3 is a diagram showing a construction of a reception system of a communication device according to the present invention.

FIG. 3 is a diagram showing a construction of a reception system of a communication device according to the present invention, and for example, shows a construction of an ATU-R reception system. In addition, a construction of an ATU-C reception system is similar. In FIG. 3, with the ATU-R reception system, the reception data (the above-described transmission data) is subjected to a low-pass filter in an analog processing and ADC (corresponding to ANALOG PROCESSING AND ADC shown in the figure) 141, and thereafter, the analog waveform is converted to the digital waveform through the A/D converter, and an adaptive equalization processing is performed in time domain equalizer (corresponding to TEC) 142.

The data having been subjected to the time domain adaptive equalization processing is converted from the serial data to the parallel data in an input serial/parallel buffer (corresponding to INPUT SERIAL/PARALLEL BUFFER) 143. The parallel data is subjected to fast Fourier transform in a fast Fourier transform section (corresponding to FFT: Fast Fourier transform) 144, and thereafter subjected to a frequency domain adaptive equalization processing in a frequency domain equalizer (corresponding to FEC) 145.

Then, the data having been subjected to the frequency domain adaptive equalization processing is converted to serial data through a complex processing (complex method of maximum likelihood) and the tone ordering processing performed in a constellation and gain scaling (corresponding to CONSTELLATION AND GAIN SCALING) 146 and a tone ordering (TONE ORDERING) 147, and thereafter, processing such as a rate convert processing by means of rate converters (corresponding to RATE-CONVERTOR) 148, 149, a de-interleaving processing by means of de-interleave (corresponding to DEINTERLEAVE) 150, FEC (forward error correction) and a de-scramble processing by means of DESCRAM&FEC 151, 152, and CRC (cyclic redundancy check) by means of a cyclic redundancy check (corresponding to CRC) 153, 154 are performed, thereby the reception data is finally reproduced in a multiplex/sync control (corresponding to MUX/SYNC CONTROL shown in the figure) 155.

With the communication device in the ADSL communication method constructed as described above, mutual interference occurring because the ADSL transmission line and the TCM-ISDN transmission line are tied up at an aggregate line on the way and adjacent to each other can be rejected. Below is a detailed description of a method of rejecting interference in the TCM-ISDN due to the ADSL, and interference between ADSLs, that is, interference of the ATU-C in other ATU-C and interference of ATU-R in other ATU-R, which has not heretofore been considered in conventional ADSL communication devices.

At first, an outline of the above-described interference rejection method will be described with reference to FIG. 1. For example, according to the interference rejection method of the present invention, the ATU-C shifts the TTR in the own ATU-C by $S_1$ with respect to the TTR of the ISDN, so that FEXT-DS transmission in the ATU-C is not involved in the ISDN-US reception of the ISDN. Specifically speaking, with the OCU in the TCM-ISDN, the ISDN-US reception is always completed at a point 7 UI before the start of TTR of the ISDN, for the next ISDN-DS transmission. Therefore, inside the ATU-C, $S_1$ is decided so that the FEXT-DS transmission is started after that point. Thereby, the ISDN-US reception in the OCU is not affected by interference of the FEXT-DS transmission of the ATU-C.

Moreover, the ATU-C transmits the TTR to the ATU-R, with a variable delay $S_2$ corresponding to the distance with the ATU-R added to the inside TTR delayed by $S_1$ previously with respect to the TTR of ISDN. That is to say, $S_2$ is adjusted so that the FEXT-DS transmission of the ATU-C does not become interference in the FEXT-US reception of the ISDN, and that the FEXT-US transmission of the ATU-R does not become interference in the ISDN-DS reception of the ISDN. As a result, the FEXT-DS transmission of ATU-C does not become NEXT noise with respect to the FEXT-US reception of other ATU-C.

Figure 4:
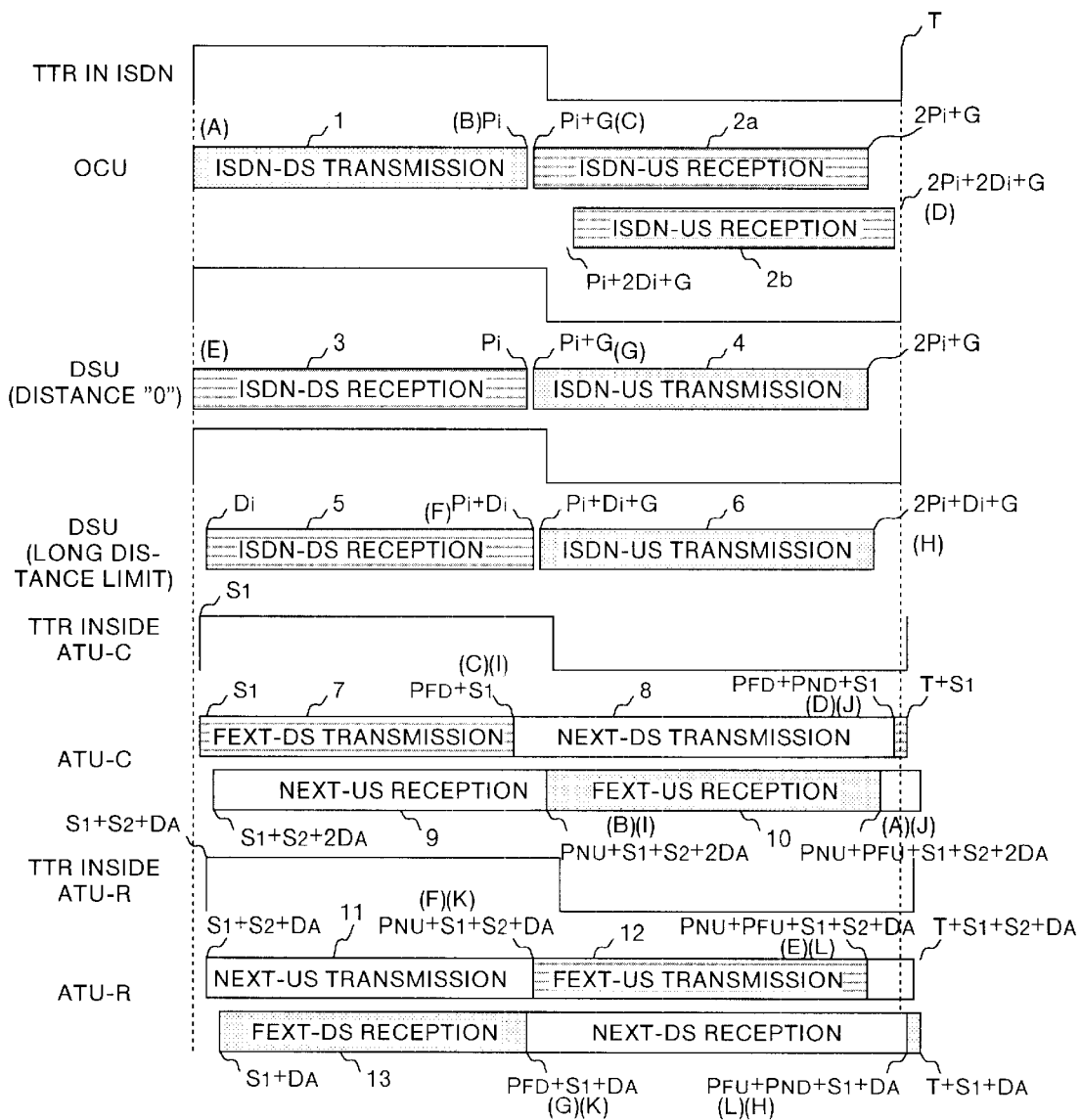
FIG. 4 is a timing chart for explaining in detail an interference rejection method according to the present invention.

The above-described interference rejection method will now be described in detail with reference to drawings. FIG. 4 is a timing chart for explaining in detail interference rejection method according to the present invention. In FIG. 4, 1 denotes ISDN-DS transmission from the OCN, 2a and 2b respectively denote ISDN-US reception to the OCN with a distance "0" or in the long distance limit, 3 and 5 respectively denote ISDN-DS reception to DSU with a distance "0" or in the long distance limit, 4 and 6 respectively denote ISDN-US transmission from the DSU with a distance "0" or in the long distance limit, 7 denotes FEXT-DS transmission from the ATU-C, 8 denotes NEXT-DS transmission from the ATU-C, 9 denotes NEXT-US reception to the ATU-C, 10 denotes FEXT-US reception to the ATU-C, 11 denotes NEXT-US transmission from the ATU-R, 12 denotes FEXT-US transmission from the ATU-R, 13 denotes FEXT-DS reception to the ATU-R, and 14 denotes NEXT-DS reception to the ATU-R. Here, the above-described distance "0" means that the distance between the OCU and the DSU is "0", and the long distance limit means the longest distance capable of compensating the communication characteristic between the OCU and the DSU.

The delays $S_1$ and $S_2$ are to be derived from a relational expression between respective communication services determined from FIG. 4. At first, an expression (A) is set up from a starting point of ISDN-DS transmission (A) and an end point of FEXT-US reception (A), based on one cycle T of TTR (2.5 ms=2760 samples=800 UI):

$$P_{NU}+P_{FU}+S_1+S_2+2D_A \leq T \qquad (A),$$

wherein, $P_{NU}$ denotes time for NEXT-US transmission or NEXT-US reception (1320 samples), and $P_{PU}$ denotes time for FEXT-US transmission or FEXT-US reception (1288 samples). Moreover, $D_A$ denotes a transmission line delay corresponding to the distance, and takes a value of from 0 to 16 UI.

Then, an expression (B) is set up from an end point of ISDN-DS transmission (B) and a starting point of FEXT-US reception (B):

$$P_i \leq P_{NU}+S_1+S^2+2D_A \qquad (B)$$

wherein $P_i$ denotes time for ISDN transmission or reception (377 UI).

Then, an expression (C) is set up from an end point of FEXT-DS transmission (C) and a starting point of ISDN-US reception (C):

$$P_{FD}+S_1 \leq P_i+G \qquad (C)$$

wherein PFD denotes time for FEXT-DS transmission or FEXT-DS reception (1240 samples), and G is 7 UI.

Then, an expression (D) is set up from a starting point of FEXT-DS transmission (D) and an end point of ISDN-US reception (D), $$2P_i+2D_i+G \leq P_{FD}+P_{ND}+S_1 \qquad (D)$$

wherein PND denotes time for NEXT-DS transmission or NEXT-DS reception (1472 samples), and $D_i$ denotes transmission line delay 16 UI in the long distance limit.

Then, an expression (E) is set up from an end point of FEXT-US transmission (E) and a starting point of ISDN-DS reception (E):

$$P_{NU}+P_{FU}+S_1+S_2+D_A \leq T \tag{E}$$

Then, an expression (F) is set up from a starting point of FEXT-US transmission (F) and an end point of ISDN-DS reception (F):

$$P_i+D_i \leq P_{NU}+S_1+S_2+D_A \tag{F}$$

Then, an expression (G) is set up from a starting point of ISDN-US transmission (G) and an end point of FEXT-DS reception (G), $$P_{FD}+S_1+D_A \leq P_i+G \tag{G}$$

Then, an expression (H) is set up from an end point of ISDN-US transmission (H) and a starting point of FEXT-DS reception (H), $$2P_i+D_i+G \leq P_{FD}+P_{ND}+S_1+D_A \tag{H}$$

Then, an expression (I) is set up from an end point of FEXT-DS transmission (I) and a starting point of FEXT-US reception (I):

$$P_{FD}+S_1 \leq P_{NU}+S_1+S_2+2D_A \tag{I}$$

Then, an expression (J) is set up from a starting point of FEXT-DS transmission (J) and an end point of FEXT-US reception (J):

$$P_{NU}+P_{FU}+S_1+S_2+2D_A \leq P_{FD}+P_{ND}+S_1 \tag{J}$$

Then, an expression (K) is set up from a starting point of FEXT-US transmission (K) and an end point of FEXT-DS reception (K):

$$P_{FD}+S_1+D_A \leq P_{NU}+S_1+S_2+D_A \tag{K}$$

Finally, an expression (L) is set up from an end point of FEXT-US transmission (L) and a starting point of FEXT-DS reception (L):

$$P_{NU}+P_{FU}+S_1+S_2+D_A \leq P_{FD}+P_{ND}+S_1+D_A \tag{L}$$

Here, if variables in the above-described expressions are transposed to the right side in order to determine the relations between $S_2$ and $D_A$, and $S_2$ and $S_1$, Expressions (A) to (L) are given as described below.

$$S_2+2D_A \leq T-P_{NU}-P_{FU}-S_1 \tag{A}$$

$$S_2+2D_A \leq P_i-P_{NU}-S_1 \tag{B}$$

$$S_1 \leq P_i-P_{FD}+G \tag{C}$$

$$S_1 \leq 2P_i-P_{FD}-P_{ND}+2D_i+G \tag{D}$$

$$S_2+D_A \leq T-P_{NU}-P_{FU}-S_1 \tag{E}$$

$$S_2+D_A \leq P_i-P_{NU}-S_1+D_i \tag{F}$$

$$D_A \leq P_i-P_{FD}-S_1+G \tag{G}$$

$$D_A \leq 2P_i-P_{FD}-P_{ND}-S_1+D_i+G \tag{H}$$

$$S_2+2D_A \leq P_{FD}-P_{NU} \tag{I}$$

$$S_2+2D_A \leq P_{FD}+P_{ND}-P_{NU}-P_{FU} \tag{J}$$

$$S_2 \leq P_{FD}-P_{NU} \tag{K}$$

$$S_2 < P_{FD}+P_{ND}-P_{NU}-P_{FU} \tag{L}$$

Then, in the above Expressions (A) to (L), if a predetermined value is substituted in the variables, the following expressions can be obtained.

$$S_2+2D_A \leq 152 \text{ samples}-S_1 \tag{A}$$

$$S_2+2D_A \leq 377 \text{ UI}-1320 \text{ samples}-S_1 \tag{B}$$

$$S_1 \leq 384 \text{ UI}-1240 \text{ samples} \tag{C}$$

$$S_1 \leq 793 \text{ UI}-2712 \text{ samples} \tag{D}$$

$$S_2+D_A \leq 152 \text{ samples}-S_1 \tag{E}$$

$$S_2+D_A \geq 393 \text{ UI}-1320 \text{ samples}-S_1 \tag{F}$$

$$D_A \leq 384 \text{ UI}-1240 \text{ samples}-S_1 \tag{E}$$

$$D_A \leq 777 \text{ UI}-2712 \text{ samples}-S_1 \tag{H}$$

$$S_2+2D_A \leq 80 \text{ samples} \tag{I}$$

$$S_2+2D_A \leq 104 \text{ samples} \tag{J}$$

$$S_2 \geq 80 \text{ samples} \tag{K}$$

$$S_2 \leq 104 \text{ samples} \tag{L}$$

Moreover, conversion of variables in the above-described Expressions (A) to (L) into µs unit results in the following expressions which show the relations between $S_2$ and $D_A$, and $S_2$ and $S_1$.

$$S_2+2D_A \leq 137.6811594 \text{ µs}-S_1 \tag{A}$$

$$S_2+2D_A \leq -17.527127391 \text{ µs}-S_1 \tag{B}$$

$$S_1 \leq 76.8115942 \text{ µs}-S_1 \tag{C}$$

$$S_1 \leq 21.60326078 \text{ µs}$$

$$S_2+D_A \leq 137.6811594 \text{ µs}-S_1 \tag{E}$$

$$S_2+D_A \leq 32.47282609 \text{ µs}-S_1 \tag{F}$$

$$D_A \leq 76.8115942 \text{ µs}-S_1 \tag{G}$$

$$D_A \leq -28.39673913 \text{ µs}-S_1 \tag{H}$$

$$S_2+2D_A \leq -72.46376812 \text{ µs} \tag{I}$$

$$S_2+2D_A \leq 94.20289855 \text{ µs} \tag{J}$$

$$S_2 \leq -72.46376812 \text{ µs} \tag{K}$$

$$S_2 \leq 94.20289855 \text{ µs} \tag{L}$$

Here, since the ADSL transmission line delay is always positive, in addition to the above Expressions (A) to (L), the following conditional expression can be also obtained.

$$D_A \geq 0 \tag{M}$$

Then, based on the conditions of the above Expressions (A) to (M), $S_1$ and $S_2$ are determined. Two methods for determining the values of $S_1$ and $S_2$ are now described in detail. At first, in the first method, under the condition of $D_A=16$ UI, $S_1$ is calculated using points (D) and (G) having the smallest margin among from the point (A) to the point (M). Here, by using the Expression (D) and the Expression (G) having the smallest margin, conditions of other computational expressions can be easily compensated.

For example, if it is assumed that the margin at the point (D) is $M_D$, $M_D$ can be determined by the following expression:

$$M_D = (P_{FD} + P_{ND} + S_1) - (2P_i + 2D_i + G) \quad (1)$$

$$= 2712 \text{ samples} + S_1 - 793 \text{ UI}$$

On the other hand, if it is assumed that the margin at the point (G) is $M_G$, $M_S$ can be obtained by the following expression:

$$M_G = (P_i + G) - (P_{FD} + S_1 + D_A) \quad (2)$$

$$= 368 \text{ UI} - 1240 \text{ samples} - S_1$$

Here, from Expressions (1) and (2), the sum of the two margins are obtained.

$$M_D + M_G = 1472 \text{ samples} - 425 \text{ UI} \quad (3)$$

By performing this processing, $S_1$ is deleted, and $M_D + M_G$ become a constant which does not vary due to $S_1$. This shows that equalization of two margins results in a stable margin for both of them. Inversely speaking, it means that if either of two margins is increased, the other margin decreases. Accordingly, when $M_D$ and $M_G$ are determined from this condition, the following expression can be obtained:

$$M_D = M_G = (M_D + M_G)/2 \quad (4)$$

$$= (1472 \text{ samples} - 425 \text{ UI})/2$$

Here, though the margins at points (D) and (G) are made equal, if precision in the timing setting is sufficiently high and it is not necessary to ensure a large margin, either of two margins may be decreased than the other margin.

Then, when $M_G$ obtained from the Expression (4) is substituted in the Expression (2), $S_1$ can be obtained as an Expression (5). Here, even if $M_D$ is substituted in the Expression (1), the same $S_1$ can be obtained:

$$S_1 = -M_G + 368 \text{ UI} - 1240 \text{ samples} \quad (5)$$

$$= 24.20743 \text{ (µs)}$$

Figure 5:
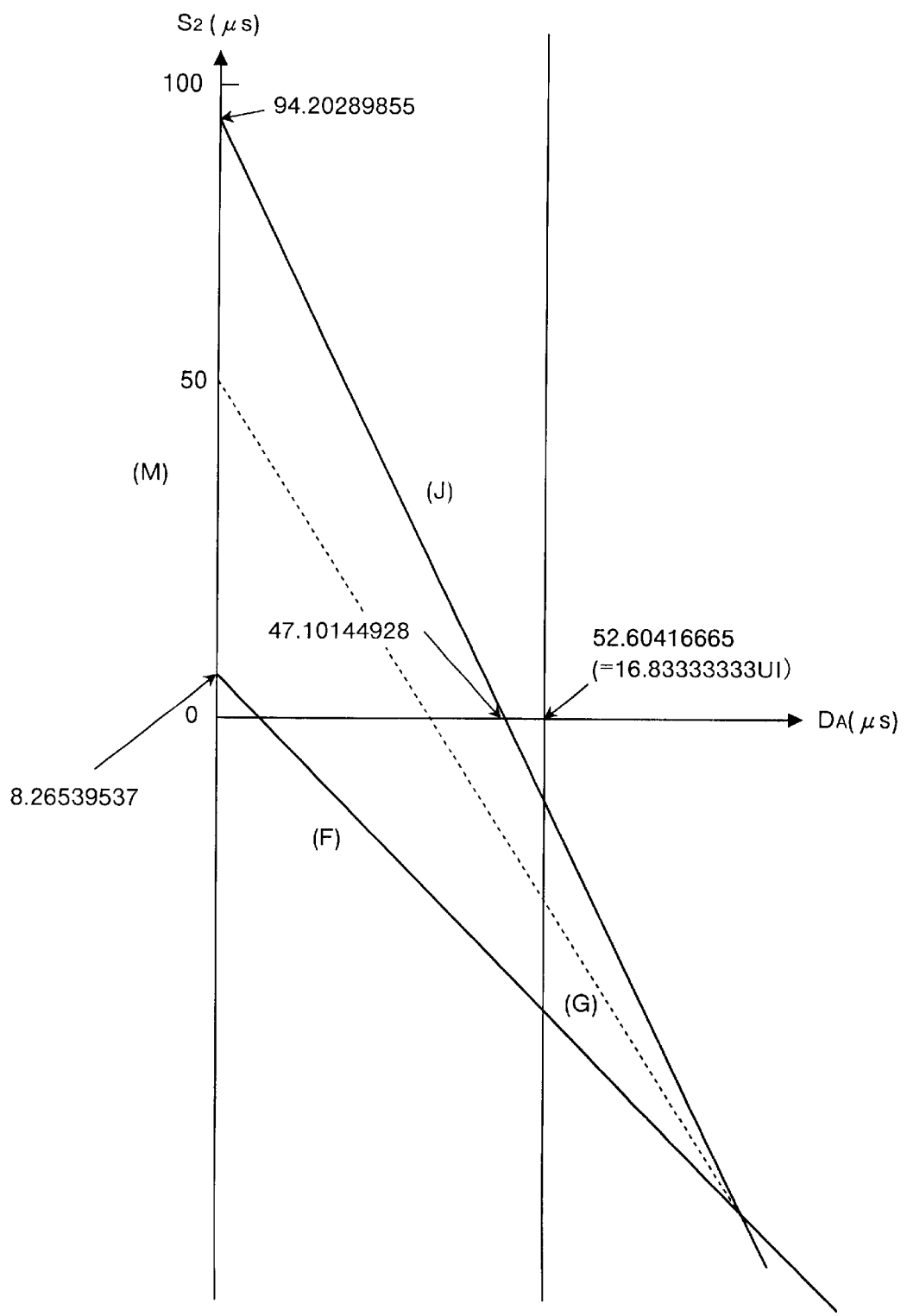
FIG. 5 is a diagram showing an allowable range of $S_2$ when the transmission line delay $D_A$ is in a range of from 0 to 16 UI and a value of $S_2$ determined by a first method.
Figure 6:
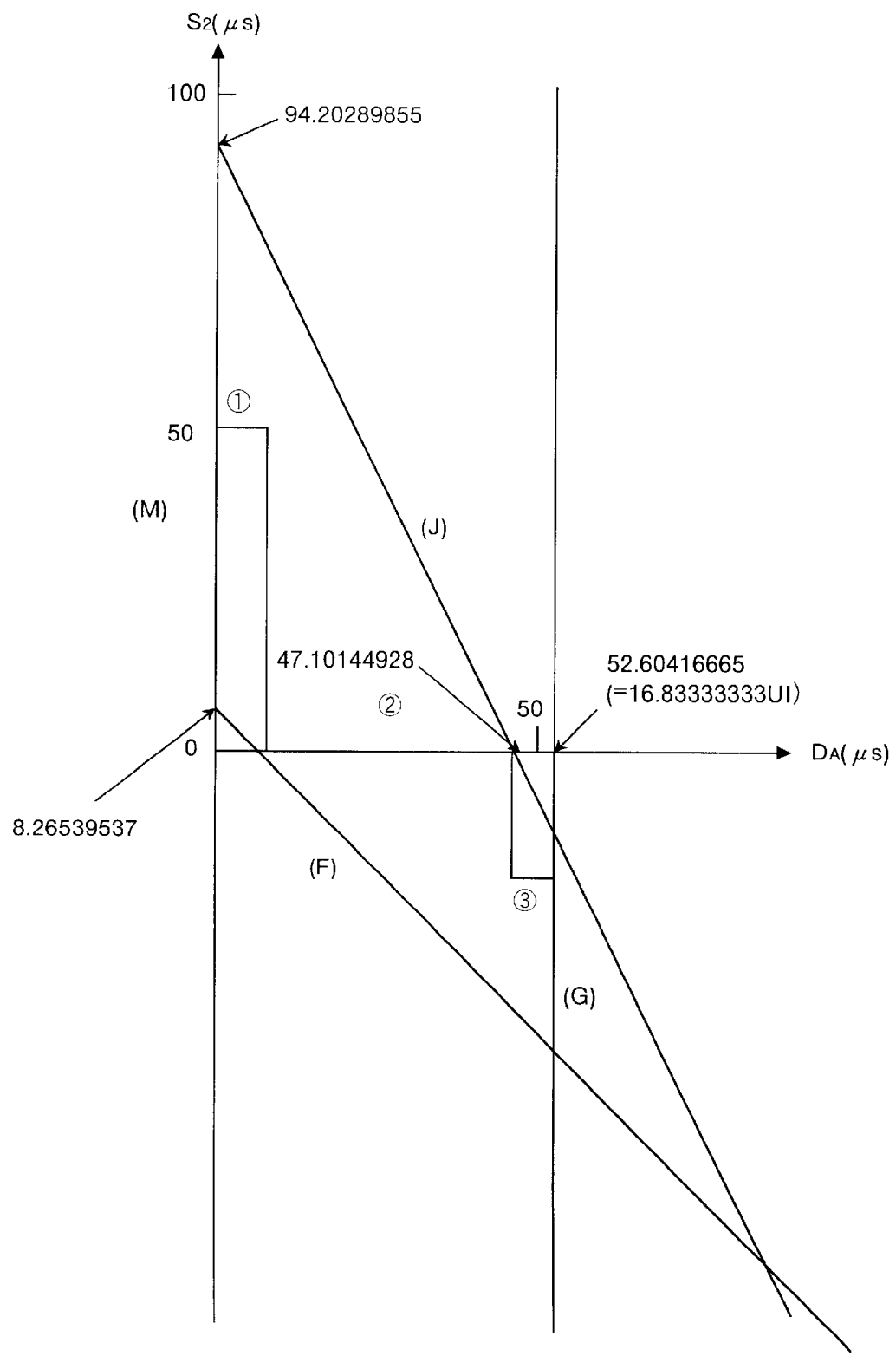
FIG. 6 is a diagram showing an allowable range of $S_2$ when the transmission line delay DA is in a range of from 0 to 16 UI and a value of $S_2$ determined by a second method.

Thereby, $S_1$ can be fixed, and further, the allowable range of $S_2$ can be determined in the case where the conditional expressions of from the above (A) to (M) are satisfied, and the transmission line delay DA is from 0 to 16 UI. FIG. 5 is a diagram showing an allowable range of $S_2$ when DA is in the range of from 0 to 16 UI. In addition, as shown in FIG. 5, in this embodiment, if Expressions (F), (G), (J) and (M) are satisfied, it means that all the conditional expressions are satisfied. That is to say, a portion surrounded by Expressions (F), (G), (J) and (M) becomes a range that $S_2$ can take.

Next, in the first method, $S_2$ can be derived from Expressions (F) and (J), as shown in FIG. 5. $S_2$ determined herein varies to an optimum value (e.g., so that the margins with respect to Expressions (F) and (J) become the same) by means of the transmission line delay DA, as shown in the figure, and is assumed to be a value shown by a dotted line.

For example, $S_2$ determined from the Expression (F) is calculated as follows:

$$S_2 = P_i + D_i - P_{NU} - D_A = -D_A + 656 \text{ samples} - 187.5 \text{ UI} \quad (6)$$

On the other hand, $S_2$ determined from the Expression (J) is calculated as follows:

$$S_2 = P_{FD} + P_{ND} + S_1 - P_{NU} - P_{FU} - S_1 - 2D_A \quad (7)$$

$$= -D_A + 104 \text{ samples}$$

Accordingly, the optimum value of $S_2$ shown by the dotted line (that is, dotted line in the figure) can be determined from the Expression (8):

$$S_2 = -1.5D_A + (104 \text{ samples} + 1656 \text{ samples} - 187.7 \text{ UI})/2 \quad (8)$$

$$= -1.5D_A + 51.23415 \text{ (µs)}$$

As a result, $S_1$ and $S_2$ can be calculated from one expression corresponding thereto, that is, from Expression (5) and Expression (8). In the ADSL, by shifting TTR by $S_1$ and $S_2$ calculated herein, interference between ADSL and TCM-ISDN, and interference between ADSLs relative to each other can be rejected.

The second method for determining values of $S_1$ and $S_2$ will now be described. Here, $S_1$ determined by the second method can be obtained by the similar method as in the above-mentioned first method; hence its description is omitted for simplicity.

In the second method, $S_2$ has values of three stages, (1), (2) and (3). Hence, interference in the TCM-ISDN due to the ADSL, and interference between ADSLs relative to each other can be rejected, and $S_2$ can be fixed to three values. As a result, it is not necessary to determine $S_2$ by calculation of an expression as in the first method; thereby enabling reduction of calculation amount, and high speed processing is facilitated. Moreover, $S_2$ can be made 0 µs, that is, $S_2$ can be deleted (fixed to one value) by designating values (1) and (3) of $S_2$ that are relatively rare cases in communication as an optional function, thereby enabling communication with high efficiency.

To realize the above-described interference rejection method, however, it is required that the transmission line delay $D_A$ can be measured. That is to say, if $D_A$ cannot be determined, $S_1$ and $S_2$ cannot be determined. Therefore, according to the interference rejection method of the present invention, this is handled by measuring a delay between the ATU-C and ATU-R, without measuring the distance of the ISDN. That is to say, according to the interference rejection method of the present invention, it is characterized in that the transmission line delay $D_A$ can be measured by measuring a delay between the ATU-C and ATU-R.

Figure 7:
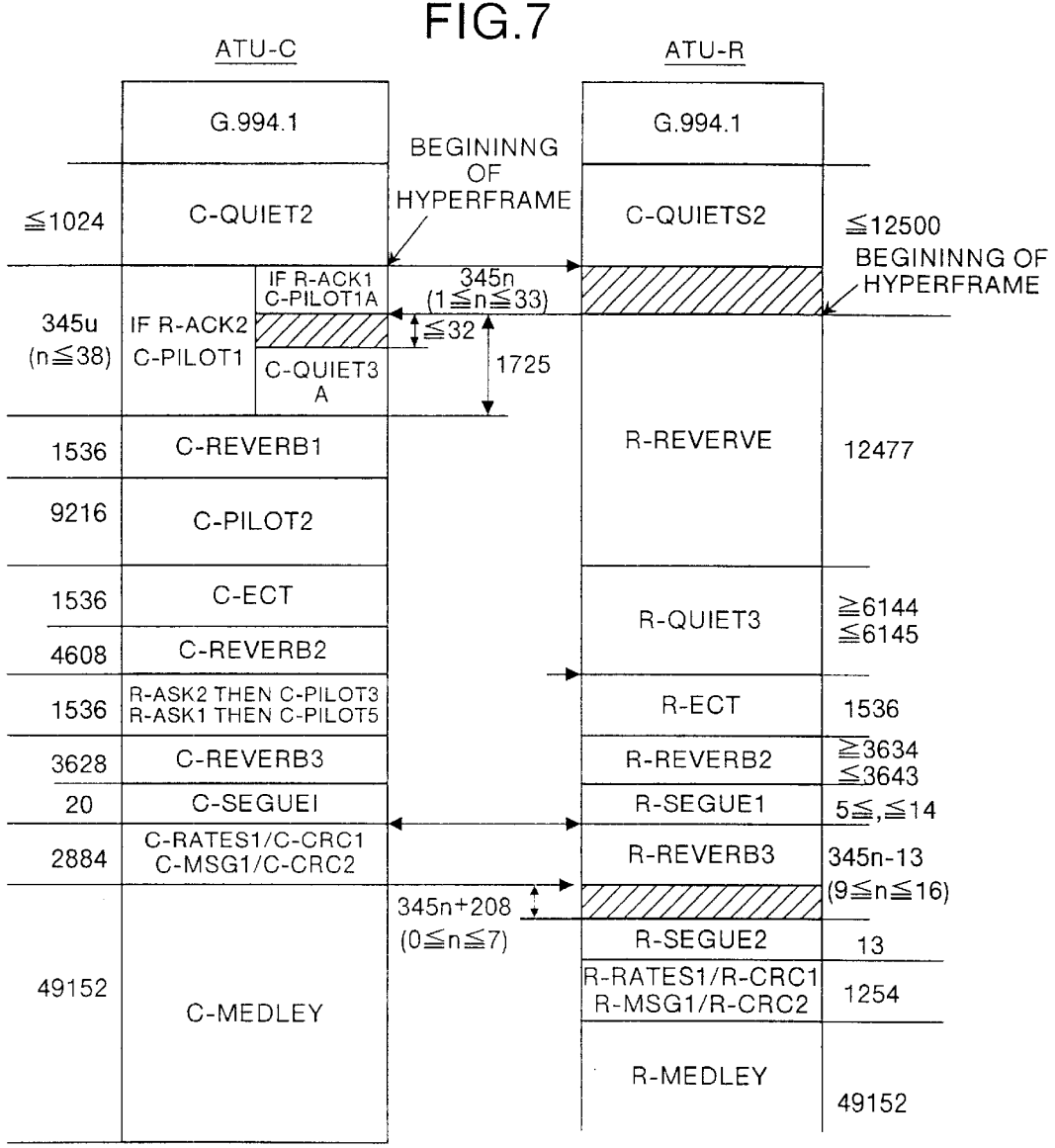
FIG. 7 is a diagram showing an initializing sequence in the ADSL.

For example, in the ADSL communication method, the ATU-C transmits a pilot signal (C-PILOT1) for initial synchronization to the ATU-R, in accordance with the initialization sequence shown in FIG. 7. TTR is included therein. Then, the ATU-C transmits signals to ATU-R sequentially in an order of reverberation (C-REVERB1), C-PILOT2, and so on.

To perform the above sequence, it is necessary that hyper-frame synchronization should be established between the ATU-C and the ATU-R, at a point of "Beginning of Hyper frame" shown in the figure. Therefore, it is necessary that the ATU-C calculates $S_1$ and $S_2$ before that point, and shifts the TTR by a predetermined time, that is, $S_1$ and $S_2$.

Accordingly, the ATU-C transmits a specific signal for measuring a round trip time in the section of C-QUIET2 shown in the figure, waits for a response from the ATU-R with respect to the transmission signal, and measures the delay time, that is, RTD (Round Trip Delay). Specifically, as shown in FIG. 8(b), the ATU-C transmits a signal reversed for every symbol by a carrier of, for example, tone 16, and the ATU-R responds thereto and returns the signal reversed for every symbol by a carrier of tone 32 which is the double frequency. Then, by detecting a change in phase of the returned signal, that is, by detecting a point where the phase changes by 180 degrees, an edge in the response signal is recognized to thereby measure the RTD.

Here, for the signals of tone 16 and tone 32 shown in the figure, a sin wave having a low frequency is used, for the convenience sake of explanation, but this signal is actually a signal having a higher frequency. Moreover, the tone used herein is not limited thereto, and any tone may be used, so long as these have frequencies different in the outward trip and the return trip. In addition, the RTD may be measured with a method other than the phase detection method.

As the merits for measuring the RTD by the above method, there can be mentioned two points. One is that since calculation by this method is very easy, the processing time by means of the ATU-R is short. The other is that the frequencies are not overlapped on each other in the first half and the second half, by performing communication with the double frequency for the return trip, hence signals from the ATU-R can be recognized easily by the ATU-C.

Figure 8A:
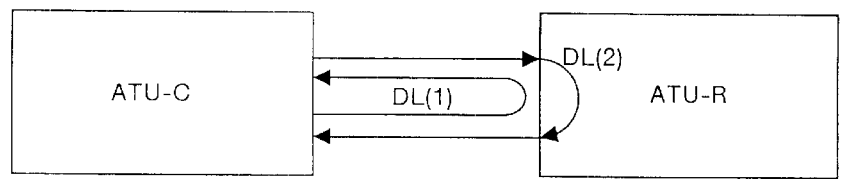
FIG. 8 is a diagram showing a method for calculating the transmission line delay.
Figure 8B:
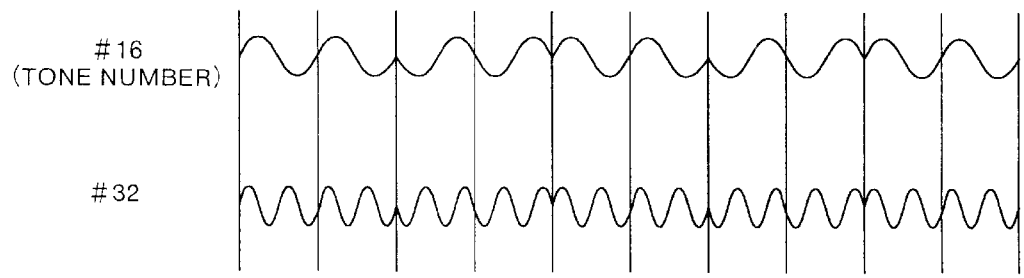
Figure 9:
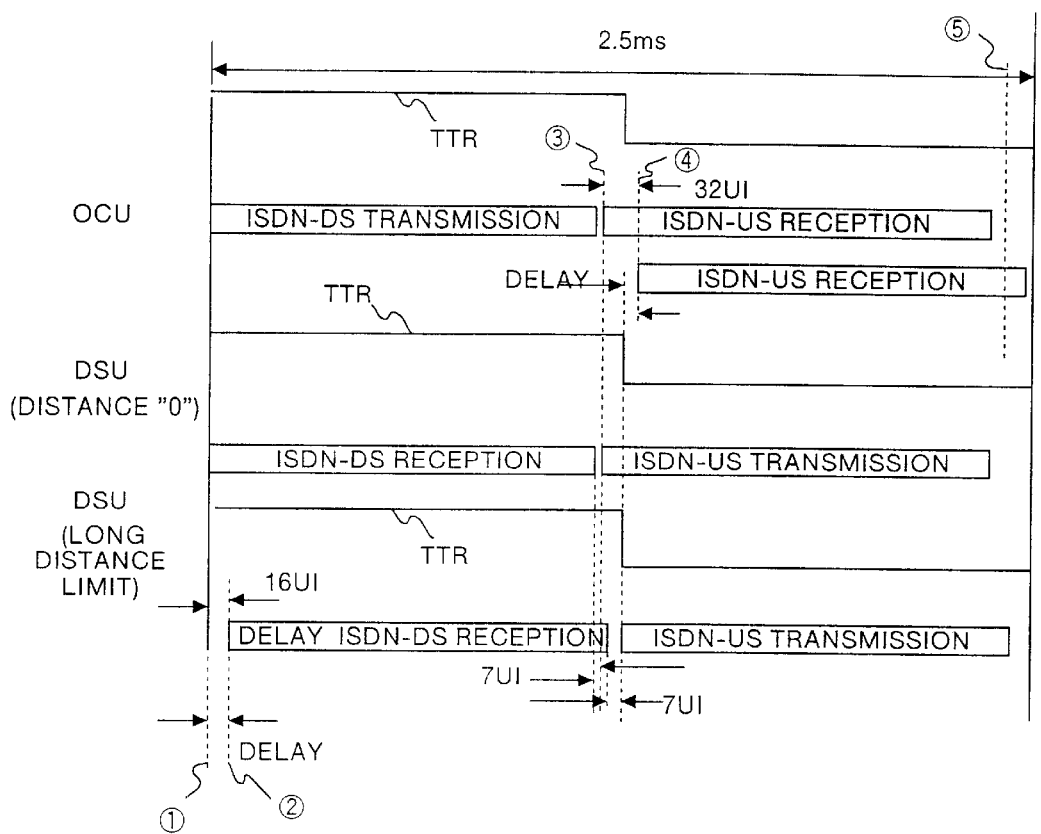
FIG. 9 is a diagram showing a signal flow in the TCM-ISDN service.
Figure 10:
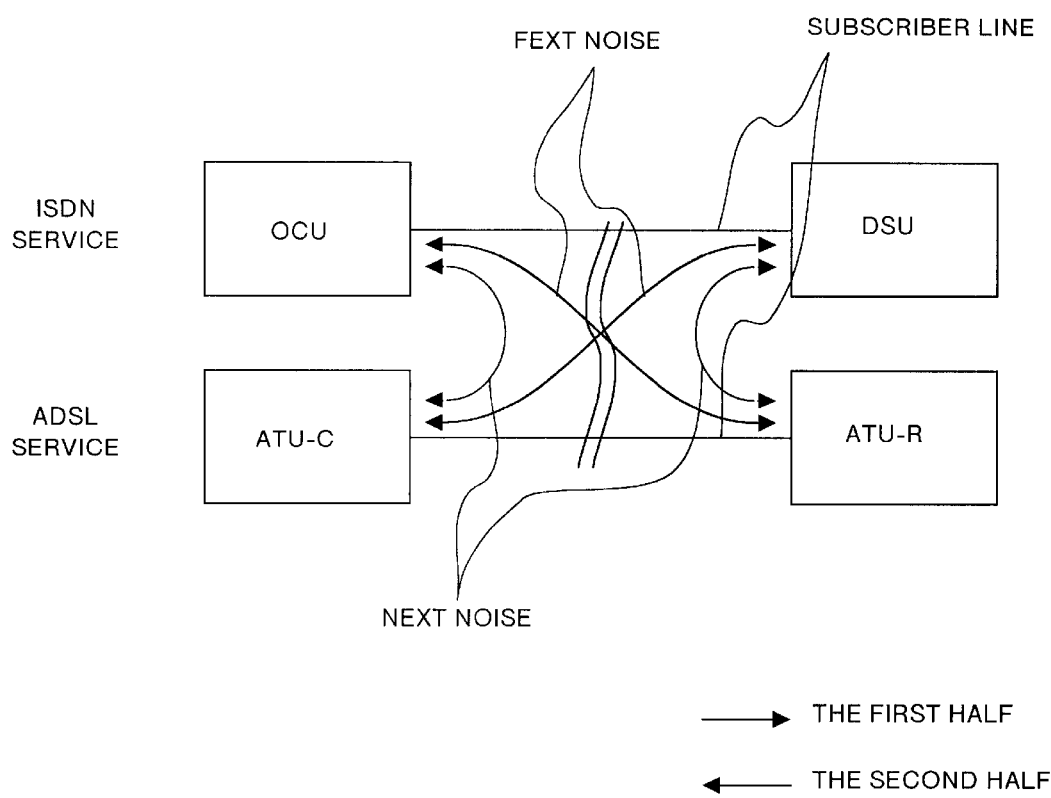
FIG. 10 is a diagram for explaining NEXT noise and FEXT noise.
Figure 13:
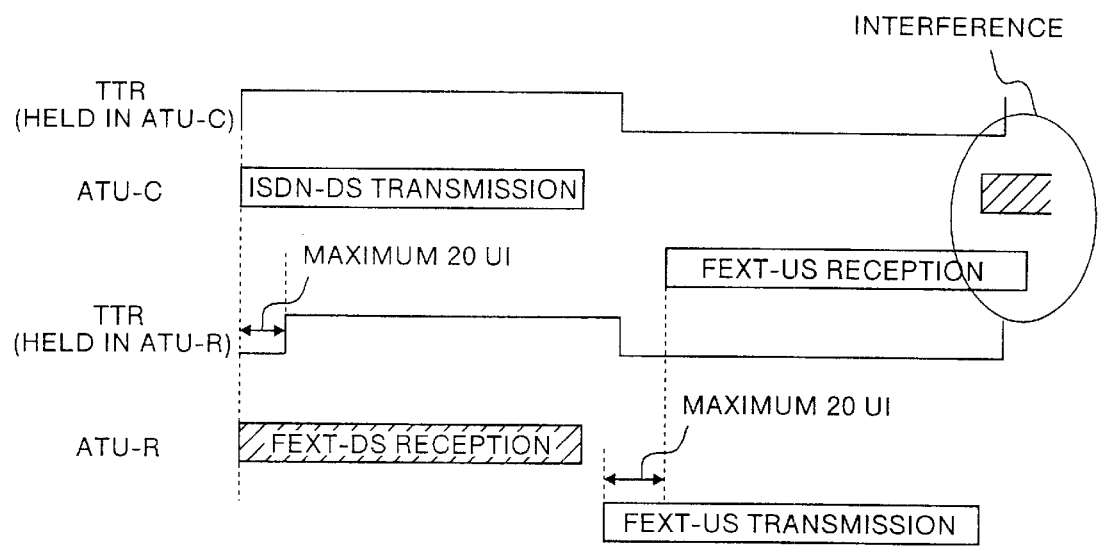
FIG. 13 is a diagram for explaining interference between ADSLs.

Therefore, if it is assumed that the former delay time from transmission to reception of the RTD signal is DL (1), and the calculation delay time in the ATU-R is DL (2) (see FIG. 8 (a)), the ATU-C can easily determine the transmission line delay for one way $D_A$ from an arithmetic expression of (DL (1)–DL (2))/2.

Thereby, before starting hyper-frame synchronization between the ATU-C and ATU-R, the ATU-C can determine the transmission line delay DA, and as a result, $S_1$ and $S_2$ for delaying the TTR can be easily obtained.

In the description described above, $S_1$ and $S_2$ for delaying the TTR are calculated based on the value of transmission line delay DA, but hereinafter a method for calculating $S_1$ and $S_2$ without relying on the transmission line delay $D_A$ is described.

At first, the condition of the above Expression (D) is changed as in the Expression (D)' shown below:

$$T(\text{represents one cycle of TTR}) \leq P_{FD} + P_{ND} + S_1 \qquad (D)'$$

As described above, by changing the Expression (D), interference at the point (D) can be completely rejected. Hence, if conditions of $S_1$ is calculated based on the Expression (D)', these can be represented by the following expression:

$$S_1 > T - P_{FD} - P_{NDd} \geq 2760\ \text{samples} - 1240\ \text{samples} - 1472\ \text{samples} \geq 48\ \text{samples} \qquad (D)'$$

Figure 14A:
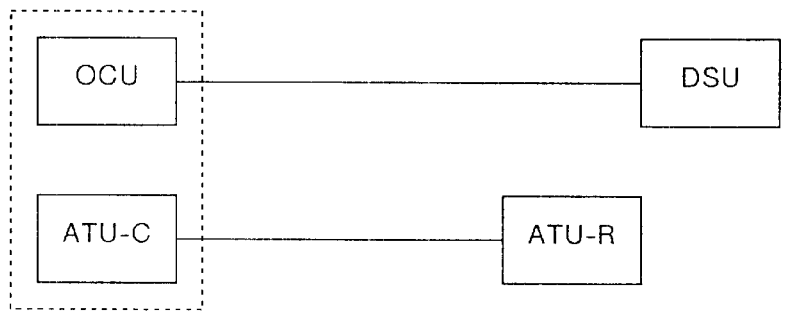
FIG. 14 is a diagram showing a construction of a communication system.
Figure 14B:
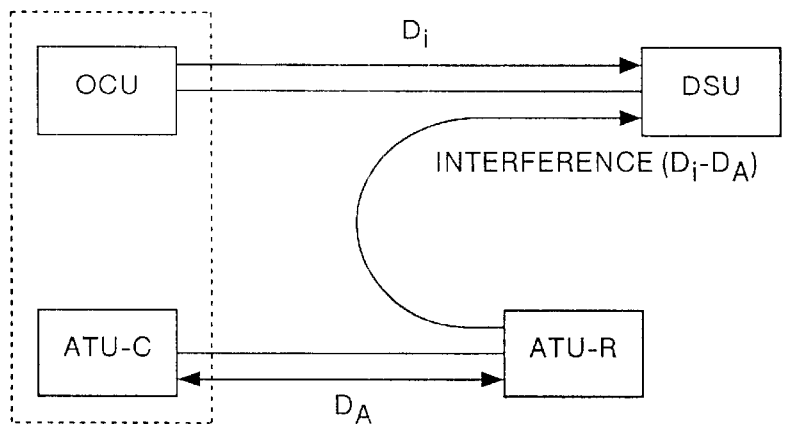
Figure 14C:
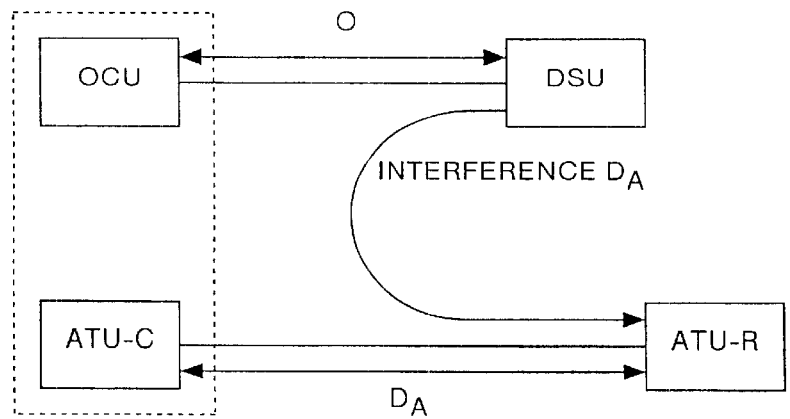

Moreover, the device OCU on the ISDN station side and the device ATU-C on the ADSL station side are in many cases installed in the same station (see FIG. 14(a)), and from this condition, conditions shown in FIG. 14(b) and FIG. 14(c) are effected between the device DSU on the ISDN terminal side and the device ATU-R on the ADSL terminal side. That is to say, the Expressions (F) and (G) are rewritten as follows:

$$P_i + D_i \leq P_{NU} + S_1 + S_2 + D_A + (\text{delay from ATU-R to DSU}) \leq P_{NU} + S_1 + S_2 + D_A + (D_i - D_A)$$

$$S_2 - 377\ \text{UI} - 1320\ \text{samples} - S_1 \qquad (F)$$

$$P_{FD} + S_1 + D_A \leq P_i + G + (\text{delay from DSU to ATU-R}) \leq P_i + G + D_A$$

$$S_{=384}\ \text{UI} - 1240\ \text{samples} \qquad (G)$$

Therefore, $S_1$ is calculated using points (D) and (G) having the smallest margin among from the point (A) to the point (M). Here, by using the Expression (D)' and the Expression (G) having the smallest margin, conditions of other computational expressions can be easily compensated.

For example, if it is assumed that the margin at a point (D) is $M_D'$, $M_D'$ can be obtained by the following expression:

$$M_D' = (P_{FD} + P_{NU} + S_1) - T \qquad (1)$$

On the other hand, if it is assumed that the margin at a point (G) is $M_G'$, $M_G'$ can be determined by the following expression:

$$M_G' = (P_i + G + D_A) - (P_{FD} + S_1 + D_A) \qquad (2)$$

Here, from Expressions (1)' and (2)', the sum of the two margins are obtained, in the same manner as in the first method described above, and calculation is performed so that $M_D' + M_G'$ becomes a constant that does not vary depending on $S_1$. Then, $M_D'$ and $M_G'$ can be obtained from the following expression, as described above:

$$M_D' = M_G' = (M_D' + M_G')/2 \qquad (4)'$$

Though the margins at points (D) and (G) are made equal here, if precision in the timing setting is sufficiently high and it is not necessary to ensure a large margin, either of two margins may be decreased than the other margin.

When $M_G$ obtained from the Expression (4)' is substituted in the Expression (2)', $S_1$ can be obtained as an Expression (5)'. Here, even if $M_D'$ is substituted in the Expression (1)', the same $S_1$ can be obtained.

$$S_1 = 54.3325\ (\mu s) \qquad (5)'$$

As a result, $S_1$ can be fixed without relying on the variation in the transmission line delay $D_A$.

On the other hand, $S_2$ is calculated using points (A) and (K) having the smallest margin among from the point (A) to the point (M), under a condition of $D_A = 20$ UI (as described above, it may be 16 UI). Here, by using the Expression (A) and the Expression (K) having the smallest margin, conditions of other computational expressions can be easily compensated.

For example, if it is assumed that the margin at a point (A) is $M_A$, $M_A$ can be obtained by the following expression, provided that $D_A = 20$ UI:

$$M_A = T - (P_{NU} + P_{FU} + S_1 + S_2 + 2D_A) \qquad (11)$$

On the other hand, if it is assumed that a margin at a point (K) is $M_K$, $M_K$ can be obtained from the following expression, provided that $D_A = 20$ UI:

$$M_K = (P_{NU} + S_1 + S_2 + D_A) - (P_{FD} + S_1 + D_A) \qquad (12)$$

Here, from Expressions (11) and (12), the sum of the two margins are determined, in the same manner as in the first method described above, and calculation is performed so that $M_A + M_K$ becomes a constant that does not vary depending on $S_2$. Then, $M_A$ and $M_K$ can be obtained from the following expression, as described above:

$$M_A = M_K = (M_A + M_K)/2 \qquad (14)$$

Though the margins at points (A) and (K) are made equal here, if precision in the timing setting is sufficiently high and it is not necessary to ensure a large margin, either of two margins may be decreased than the other margin.

When $M_K$ obtained from the Expression (14) is substituted in the Expression (12), $S_2$ can be obtained as an Expression (15). Here, even if $M_A$ is substituted in the Expression (11), the same $S_2$ can be obtained.

$$S_2 = 48.8076 \; (\mu s) \tag{15}$$

As a result, $S_2$ can be fixed as well as $S_1$, without relying on the variation in the transmission line delay $D_A$.

In the description of the above-described embodiment, for the convenience sake of description, a margin due to internal calculation delay or the like in the respective devices, that is, ATU-C, ATU-R, OCU and DSU are not included in all conditional expressions. Therefore, $S_1$ and $S_2$ can be obtained with higher precision, by including this margin in each conditional expression. Moreover, conditional expressions and numerical values in this embodiment are one example only for calculating $S_1$ and $S_2$. For example, by combining more optimal conditional expressions and numerical values, taking into consideration changes such as working condition and communication environment, $S_1$ and $S_2$ can be obtained with further higher precision.

As described above, in the first embodiment, a method for calculating $S_1$ and $S_2$ for delaying the TTR based on the value of transmission line delay $D_A$, and in the second embodiment, a method for calculating $S_1$ and $S_2$ without relying on the transmission line delay $D_A$, have been explained. In this embodiment, an interference rejection method will be described, in which a new condition is added to the interference rejection method in the second embodiment. That is to say, $S_1$ and $S_2$ for shifting the timing of TTR are calculated by re-setting up Expressions (A) to (L) which are relational expressions of respective communication services relative to each other.

Here, a description is given of newly added conditions. At first, a loop-timing margin $M_{LO}$ in the ATU-R is introduced. The loop-timing margin $M_{LO}$ is a margin taking into consideration an error in the transmission timing of the ATU-R, and for example, a delay occurring at the time of generating the TTR in the ATU-R from the TTR received from the ATU-C. Secondly, a system margin $M_{SYS}$ in the ATU-C and the ATU-R is introduced. The system margin $M_{SYS}$ is a margin taking into consideration a precision error in the transmission timing of the ATU-C and ATU-R, and for example, a delay occurring in the internal arithmetic processing or the like. Thirdly, a guard interval $G_T$ in the ISDN is taken into consideration. The guard interval $G_T$ is for compensating interference in the ISDN more strictly, and a period therefor is also compensated herein. Fourthly, transfers spanning the TTR cycle is inhibited for compensating the mutual interference between the ISDN and the ADSL (FIG. 15(D) and (H)). Fifthly, it is assumed that the distance from the ATU-C to the ATU-R and the distance from the OCU to the DSU are the same. Sixthly, the condition of transmission line delay $D_A$=20 UI in the second embodiment is changed to $D_A$=18.5 UI.

Figure 15:
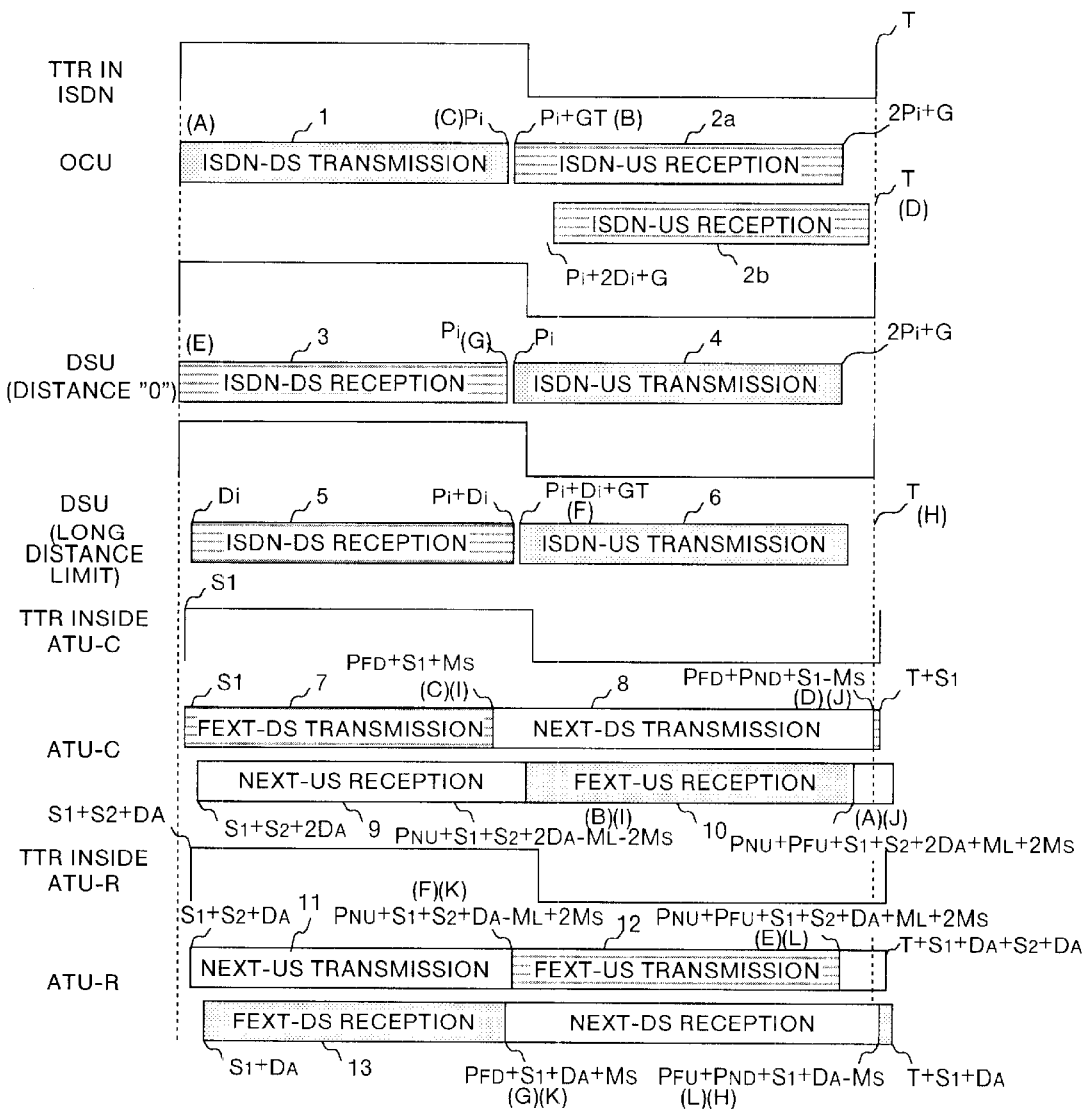
FIG. 15 is a timing chart for explaining in detail an interference rejection method according to the present invention.

In this embodiment, the. above relational expression is changed based on these conditions. FIG. 15 is a timing chart for explaining in detail the interference rejection method according to the present invention. The same parts as those in FIG. 4 in the first embodiment described above are denoted with the same reference symbols and the description thereof is omitted. Moreover, the same variables as those in the first and second embodiments are used in the relational expressions, except of particularly specified ones.

At first, based on one cycle T of TTR (2.5 ms=2760 samples=800 UI), Expression (A') is set up from a starting point of ISDN-DS transmission (A) and an end point of FEXT-US reception (A):

$$P_{NU}+P_{FU}+S_1+S_2+2D_A+M_{LO}+2M_{SYS} \leq T \tag{A'},$$

wherein the transmission line delay $D_A$ is a transmission line delay corresponding to the distance, but a fixed value of 18.5 UI is used here. Moreover, it is assumed that $M_{LO}$=4.5 $\mu s$ and $M_{SYS}$=2.89 $\mu s$.

Then, Expression (B') is set up from an end point of ISDN-DS transmission (B) including the guard interval. and a starting point of FEXT-US reception (B):

$$P_i+G_T \leq P_{NU}+S_1+S_2-M_{LO}-2M_{SYS} \tag{B'},$$

wherein the guard interval GT is assumed to be 6 UI.

Next, Expression (C') is set up from an end point of FEXT-DS transmission (C) and a starting point of ISDN-US reception (C) including the guard interval:

$$P_{FD}+S_1+M_{SYS} \leq P_i \tag{C'}$$

Then, Expression (D') is set up from a starting point of FEXT-DS transmission (D) and an end point of ISDN-US reception (D) including a condition that transfers spanning the TTR cycle are inhibited:

$$T \leq P_{FD}+P_{ND}+S_1-M_{SYS} \tag{D'}$$

Next, Expression (E') is set up from an end point of FEXT-US transmission (E) and a starting point of ISDN-DS reception (E):

$$P_{NU}+P_{FU}+S_1+S_2+M_{LO}+2 M_{SYS} \tag{E'}$$

Then, Expression (F') is set up from a starting point of FEXT-US transmission (F) and an end point of ISDN-DS reception (F) including the guard interval:

$$P_i+G_T \leq P_{NU}+S_1+S_2-M_{LO}-M_{SYS} \tag{F'}$$

Next, Expression (G') is set up from a starting point of ISDN-US transmission (G) including the guard interval and an end point of FEXT-DS reception (G):

$$P_{FD}+S_2+M_{SYS} \leq P_i \tag{G'}$$

Then, Expression (H') is set up from an end point of ISDN-US transmission (H) including a condition that transfers spanning the TTR cycle are inhibited and a starting point of FEXT-DS reception (H):

$$T \leq P_{FD}+P_{ND}+S_1-M_{SYS} \tag{H'}$$

Then, Expression (I') is set up from an end point of FEXT-DS transmission (I) and a starting point of FEXT-US reception (I):

$$P_{FD}+S_1+M_{SYS} \leq P_{NU}+S_1+S_2-M_{LO}-2M_{SYS} \tag{I'}$$

Then, an expression (J') is set up from a starting point of FEXT-DS transmission (J) and an end point of FEXT-US reception (J):

$$P_{NU}+P_{FU}+S_1+S_2+2D_A+M_{LO}+2M_{SYS} \leq P_{FD}+P_{ND}+S_1-M_{SYS} \tag{J'}$$

Then, an expression (K') is set up from a starting point of FEXT-US transmission (K) and an end point of FEXT-DS reception (K):

$$P_{FD}+S_1+M_{SYS} \leq P_{NU}+S_1+S_2-M_{LO}-2M_{SYS} \tag{K'}$$

Finally, an expression (L') is set up from an end point of FEXT-US transmission (L) and a starting point of FEXT-DS reception (L):

$$P_{NU}+P_{FU}+S_1+S_2+M_{LO}+2M_{SYS} \leq P_{FD}+P_{ND}+S_1-M_S \tag{L'}$$

Figure 16:
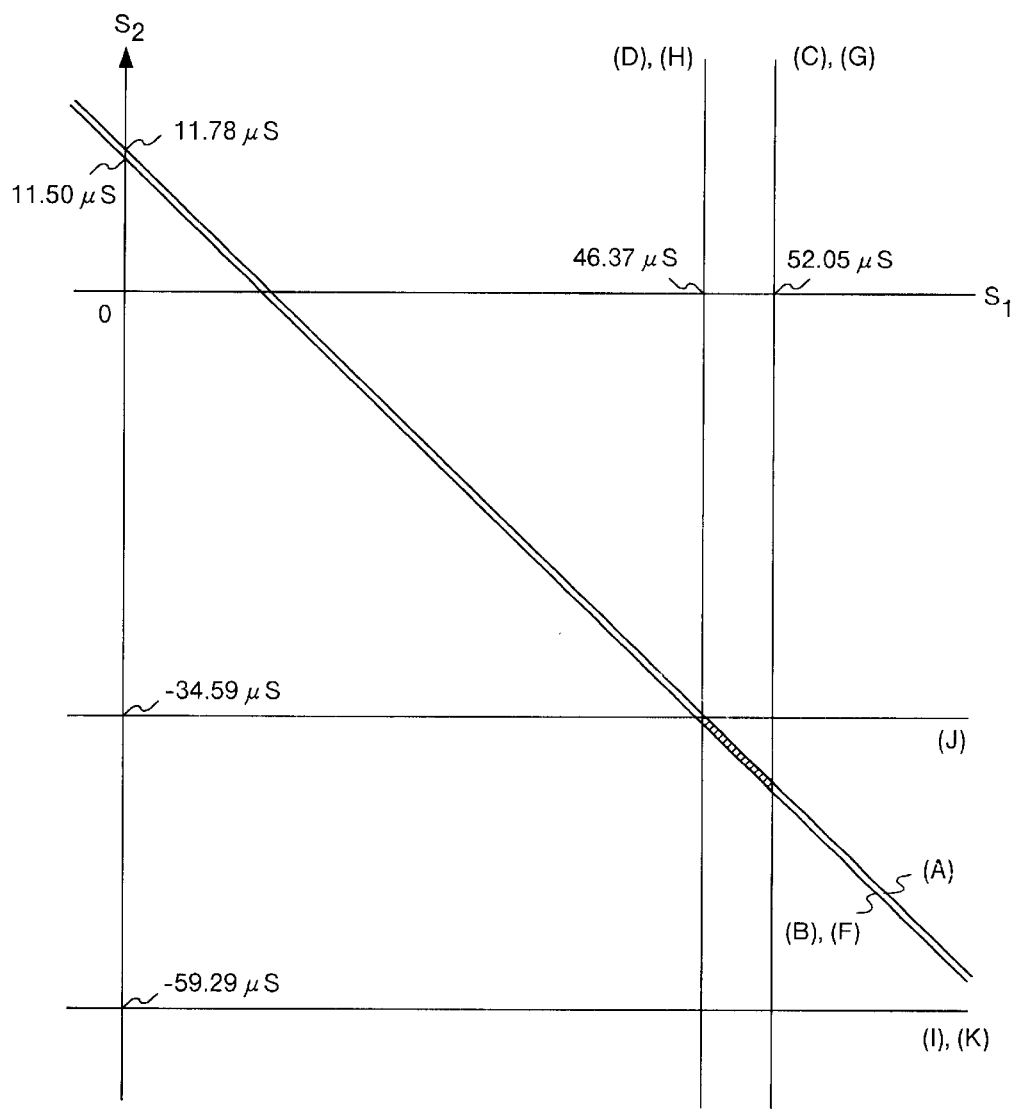
FIG. 16 is a diagram showing a relation between $S_1$ and $S_2$ determined by a relational expression.

Then, predetermined values defined in advance are substituted in the above relational expressions to obtain the relations between $S_1$ and $S2$, relations shown in FIG. 16 can be obtained. That is to say, as shown in FIG. 16, the range surrounded by the Expression (A'), Expression (B'), Expression (C'), Expression (D'), Expression (F'), Expression (G'), Expression (H') and Expression (J') becomes a range that $S_1$ and $S_2$ can take.

Here, under the condition of $D_A$=18.5 UI defined above, rough ranges of $S_1$ and $S_2$ are calculated using points (A) and (F) having the smallest margin among from the point (A) to the point (M). That is to say, by using the Expression (A') and the Expression (F') having the smallest margin, one condition for compensating other computational expressions is calculated.

For example, if it is assumed that the margin at the point (A) is $M_A$, $M_A$ can be determined by the following expression:

$$M_A = T - (P_{NU} + P_{FU} + S_1 + S_2 + 2D_A + M_{LO} + 2M_{SYS}) \quad (16)$$
$$= 2.5 \text{ ms} - (2608 \text{ samples} + S_1 + S_2 + 37 \text{ UI} + 10.28 \text{ μs})$$

On the other hand, if it is assumed that the margin at the point (F) is $M_F$, $M_F$ can be determined by the following expression:

$$M_F = (P_{NU} + S_1 + S_2 - M_{LO} - M_{SYS}) - (P_i + G_T) \quad (17)$$

Then, the sum of the two margins is obtained from the Expressions (16) and (17), in the same manner as in the first embodiment described above, and rough ranges of $S_1$ and $S_2$ are calculated from $M_A + M_F$. $M_A$ and $M_F$ can be obtained from the following expression:

$$M_A = M_F = (M_A + M_F)/2 \quad (18)$$

Then, if $M_A$ obtained from the Expression (18) is substituted in the Expression (16), the relations between $S_1$ and $S_2$ having the biggest margin can be obtained.

Then, $S_1$ is fixed from the relation shown in FIG. 16. Here, $S_1$ is fixed in the middle of the Expression (D) and the Expression (C), that is, $S_1$=(46, 37+52.05)/2=49.21 (μs). On the other hand, by substituting $S_1$ in the Expression (17) calculated above, $S_2$ can be obtained as follows:

$$S_2 = -38.04 (\mu s)$$

As described above, in this embodiment, $S_1$ and $S_2$ can be calculated with higher precision, compared to the embodiments described previously, by adding new conditions, and as a result, interference between devices can be rejected with higher precision. In addition, in this embodiment, $S_1$ and $S_2$ having the biggest margin are obtained, but these are not limited to such values, and any values may be used so long as it is within the range of the relations shown in FIG. 16. Moreover, in the first and second embodiments, TTR to the ATU-R is shifted by $S_2$ by means of the ATU-C, but in this embodiment, the device for shifting the TTR is not chosen, and either one of ATU-C or ATU-R can perform shifting of the TTR.

As described above, according to the present invention, for example, the own communication device (ATU-C) shifts the TTR (reference signal) in the own ATU-C by $S_1$ (first predetermined time), so that FEXT-DS in the ATU-C is not involved in the ISDN-US reception of the ISDN (other communication system). Moreover, the ATU-C transmits its TTR to the ATU-R (a device to be communicated), with a variable delay $S_2$ (second predetermined time) corresponding to the distance with the ATU-R added to the inside TTR delayed by $S_1$ previously. That is to say, $S_2$ is adjusted so that the FEXT-DS transmission of the ATU-C does not become interference in the FEXT-US reception of other ATU-C that is not synchronized therewith (hyper-frame synchronization). As a result, there is such an effect that all the interference between the ADSL and the ISDN and between ADSLs relative to each other can be rejected.

According to the next invention, the first predetermined time is calculated using an expression at a point where interference occurs most likely under conditions of the maximum transmission line delay, that is, where the margin is smallest in the relational expression. As a result, there is such an effect that a relational expression between devices having other conditions, for example, less possibility of interference can be easily compensated.

According to the next invention, $S_1$ (first predetermined time) and $S_2$ (second predetermined time) can be uniquely calculated respectively from one corresponding relational expression, and in the ADSL, TTR (reference signal) is shifted by $S_1$ and $S_2$ calculated herein. As a result, there is such an effect that all the interference between the ADSL and the ISDN and between ADSLs relative to each other can be rejected.

According to the next invention, $S_2$ (second predetermined time) is fixed in advance to a value satisfying the allowable range. As a result, the interference in the ISDN due to the ADSL and interference between ADSLs relative to each other can be rejected, and further, $S_2$ can be fixed to a plurality of values. Hence, since it is not necessary to determine $S_2$ by calculation of a relational expression, there can be obtained such an effect that calculation amount decreases, thereby facilitating high speed processing. In addition, there is an effect in that $S_2$ can be fixed to one by designating $S_2$ that is a relatively rare case in communication (a value close to the maximum value and the minimum value in the allowable range) as an optional function, thereby further decreasing the calculation amount and facilitating high speed processing.

According to the next invention, before the ATU-C and the ATU-R establish hyper-frame synchronization, the ATU-C calculates the transmission line delay. As a result, there can be obtained such an effect that $S_1$ (first predetermined time) and $S_2$ (second predetermined time) for delaying the TTR (reference signal) can be easily calculated, hence enabling establishment of communication without having any interference.

According to the next invention, since RTD (round trip time of a certain signal) is measured, the calculation becomes very easy, thereby reducing the processing time by the ATU-R. Moreover, for example, by communicating at the double frequency on the return trip, such an effect can be obtained that the frequency does not overlap in the first half and the second half, hence the ATU-C can easily recognize a signal from the ATU-R.

According to the next invention, for example, the own communication device (ATU-C) shifts TTR (reference signal) in the own ATU-C by $S_1$ (first predetermined time), so that FEXT-DS in the ATU-C is not involved in the ISDN-US reception of the ISDN (other communication system). Moreover, the ATU-C transmits its TTR to the ATU-R (a device to be communicated), with a variable delay $S_2$ (second predetermined time) corresponding to the distance with the ATU-R added to the inside TTR delayed by $S_1$ previously. That is to say, $S_2$ is adjusted so that the FEXT-DS transmission of the ATU-C does not become interference in the FEXT-US reception of other ATU-C that is not synchronized therewith (hyper-frame synchronization). As a result, such an effect can be obtained that all the interference between the ADSL and the ISDN and between ADSLs relative to each other can be rejected.

According to the next invention, the first predetermined time is calculated using a relational expression at a point where interference occurs most likely under conditions of the maximum transmission line delay, that is, where the margin is smallest in the relational expression. As a result, such an effect can be obtained that a relational expression between devices having other conditions, for example, less possibility of interference can be easily compensated.

According to the next invention, $S_1$ (first predetermined time) and $S_2$ (second predetermined time) can be uniquely calculated respectively from one corresponding relational expression, and in the ADSL, TTR (reference signal) is shifted by $S_1$ and $S_2$ calculated herein. As a result, there is such an effect that all the interference between the ADSL and the ISDN and between ADSLs relative to each other can be rejected.

According to the next invention, $S_2$ (second predetermined time) is fixed in advance to a value satisfying the allowable range. As a result, there can be obtained such effects that the interference in the ISDN due to the ADSL and interference between ADSLs relative to each other can be rejected, and further, $S_2$ can be fixed to a plurality of values, and since it is not necessary to determine $S_2$ by calculation of a relational expression, calculation amount decreases, thereby facilitating high speed processing. Moreover, there can be also obtained another effect in that $S_2$ can be fixed to one by designating $S_2$ that is a relatively rare case in communication (a value close to the maximum value and the minimum value in the allowable range) as an optional function, thereby further decreasing the calculation amount and facilitating high speed processing.

According to the next invention, before the ATU-C and ATU-R establish hyper-frame synchronization, the ATU-C calculates the transmission line delay. As a result, such an effect can be obtained that $S_1$ (first predetermined time) and $S_2$ (second predetermined time) for delaying the TTR (reference signal) can be easily calculated, hence enabling establishment of communication without having any interference.

According to the next invention, since RTD (round trip time of a certain signal) is measured, the calculation becomes very easy, thereby reducing the processing time by the ATU-R. Moreover, for example, by communicating at the double frequency on the return trip, the frequency does not overlap in the first half and the second half, hence the ATU-C can easily recognize a signal from the ATU-R.

According to the next invention, each communication device calculates the first predetermined time and the second predetermined time without relying on conditions of the transmission line delay, using a relational expression where interference occurs most likely, that is, the margin is smallest in the relational expression. As a result, such an effect can be obtained that a relational expression between devices having other conditions, for example, less possibility of interference can be easily compensated. Moreover, since the first predetermined time and the second predetermined time are fixed values, it is not necessary to change the value every time depending on the conditions of the transmission line delay or the like, hence there is another effect in that the calculation amount of each device can be reduced.

According to the next invention, the first predetermined time and the second predetermined time are calculated without relying on conditions of the transmission line delay, using a relational expression where interference occurs most likely, that is, the margin is smallest in the relational expression. As a result, such an effect can be obtained that a relational expression between devices having other conditions, for example, less possibility of interference can be easily compensated. Moreover, since the first predetermined time and the second predetermined time are fixed values, there is another effect in that it is not necessary to change the value every time depending on the conditions of the transmission line delay or the like, hence the calculation amount of each device can be reduced.

According to the next invention, the communication device calculates the first predetermined time and the second predetermined time, by adding new conditions to the relational expression, for example, a loop timing margin, a system margin, a guard interval in the ISDN, a condition for inhibiting transfers spanning the TTR cycle or the like. As a result, there can be obtained such an effect that more precise first predetermined time and second predetermined time can be calculated, thereby enabling interference rejection between devices with higher precision.

According to the next invention, the first predetermined time and the second predetermined time are calculated based on a relational expression obtained by adding new conditions, for example, a loop timing margin, a system margin, a guard interval in the ISDN, a condition for inhibiting transfers spanning the TTR cycle or the like. As a result, there can be obtained such an effect that more precise first predetermined time and second predetermined time can be calculated, thereby enabling interference rejection between devices with higher precision.

INDUSTRIAL APPLICABILITY

As described above, the communication device and the interference rejection method in the communication device according to the present invention are useful for communications which use a transmission line having a possibility of being affected by noise, and particularly suitable for xDSL communication in which high-speed digital communication is performed using an existing telephone line (ISDN or the like).

What is claimed is:

1. A communication device performing data communication using an Asymmetric Digital Subscriber Line (ADSL) by transmitting a reference signal to a device to be communicated with and for establishing a mutual synchronization between downstream and upstream signals comprising:

means for delaying a reference signal in a transmitting communication device by a first predetermined time;

means for adjusting a reference signal to be transmitted to a receiving communication device by a second predetermined time; and means for rejecting all mutual interference occurring between other communication systems that communicate utilizing a line having the same properties and using the same reference, the ADSL and all mutual interference occurring between ADSLs.

2. The communication device according to claim 1, further comprising:

means for calculating an allowable range of the first predetermined time from a relational expression between a communication device on the transmission side and a communication device on the reception side where interference is most likely to occur; and means for establishing a value which maximizes a margin of the allowable range and is fixed as a first predetermined time.

3. The communication device according to claim 2, further comprising:
   means for calculating an allowable range of the second predetermined time corresponding to a compensated range of a transmission line delay from a relational expression between all communication devices on the transmission side and all communication devices on the reception side having a possibility that interference may occur and the first predetermined time;
   means for calculating a value that always maximizes the calculated margin, corresponding to a variation in the transmission line delay; and
   means for designating the calculated value as the second predetermined time.

4. The communication device according to claim 3, further comprising:
   means for measuring the transmission line delay between devices in the ADSL and calculating the first predetermined time and second predetermined time prior to establishing communication between said devices and resulting in communication without any interference.

5. The communication device according to claim 4, further comprising:
   means for calculating the transmission line delay based on round trip time of a certain signal between said devices.

6. The communication device according to claim 2, further comprising:
   means for calculating an allowable range of the second predetermined time corresponding to the compensated range of the transmission line delay from a relational expression between all communication devices on the transmission side and all communication devices on the reception side having a possibility that interference may occur and the first determined time; and
   means for fixing the second predetermined time within the allowable range of the second predetermined time even if the transmission line delay varies.

7. The communication device according to claim 6, further comprising:
   measuring the transmission line delay between devices in the ADSL and calculating the first predetermined time and second predetermined time prior to establishing communication between said devices and resulting in communication without having any interference.

8. The communication device according to claim 7, further comprising:
   means for calculating the transmission line delay based on round trip time of a certain signal between said devices.

9. The communication device according to claim 1, further comprising:
   a relational expression between a communication device on the transmission side and a communication calculating an allowable range of the first predetermined time based on a device on the reception side where interference occurs most likely;
   means for fixing a value which maximizes a margin of the allowable range and setting this value as the first predetermined time;
   means for substituting the first predetermined time in all the relational expressions and in this state calculating an allowable range of the second predetermined time is calculated based on a relational expression between a communication device on the transmission side and a communication device on the reception side where interference occurs most likely; and
   means for fixing a value which maximizes the margin of the allowable range and setting this value as the second predetermined time.

10. The communication device according to claim 9, further comprising:
    means for determining a delay resulting from the internal processing in the communication devices on the transmission side and the reception side;
    means for adding new predetermined conditions for protecting said other communication systems from stricter interference levels to the relational expression; and
    means for calculating the first predetermined time and the second predetermined time based on the relational expression reflecting these conditions.

11. An interference rejection method for performing data communication using an Asymmetric Digital Subscriber Line (ADSL) by transmitting a reference signal to a device to be communicated with and for establishing a mutual synchronization between downstream and upstream signals comprising:
    delaying a reference signal in a transmitting communication device by a first predetermined time;
    adjusting a reference signal to be transmitted to a receiving communication device by a second predetermined time; and
    rejecting all mutual interference occurring between other communication systems that communicate utilizing a line having the same properties and using the same reference, the ADSL and all mutual interference occurring between ADSLs.

12. The interference rejection method according to claim 11, further comprising:
    calculating an allowable range of the first predetermined time from a relational expression between a communication device on the transmission side and a communication device on the reception side where interference is most likely to occur; and
    establishing a value which maximizes a margin of the allowable range and is fixed as a first predetermined time.

13. The interference rejection method according to claim 12, further comprising:
    calculating an allowable range of the second predetermined time corresponding to a compensated range of a transmission line delay from a relational expression between all communication devices on the transmission side and all communication devices on the reception side having a possibility that interference may occur and the first predetermined time;
    calculating a value that always maximizes the calculated margin, corresponding to a variation in the transmission line delay; and
    designating the calculated value as the second predetermined time.

14. The interference rejection method of claim 13, further comprising:
    measuring the transmission line delay between devices in the ADSL and calculating the first predetermined time and second predetermined time prior to establishing communication between said devices and resulting in communication without having any interference.

15. The interference rejection method of claim 14, further comprising:
    calculating the transmission line delay based on round trip time of a certain signal between said devices.

16. The interference rejection method of claim 12, further comprising:

calculating an allowable range of the second predetermined time corresponding to the compensated range of the transmission line delay from a relational expression between all communication devices on the transmission side and all communication devices on the reception side having a possibility that interference may occur and the first determined time; and fixing the second predetermined time within the allowable range of the second predetermined time even if the transmission line delay varies.

17. The interference rejection method of claim 16, further comprising:

measuring the transmission line delay between devices in the ADSL and calculating the first predetermined time and second predetermined time prior to establishing communication between said devices and resulting in communication without having any interference.

18. The interference rejection method of claim 17, further comprising:

calculating the transmission line delay based on round trip time of a certain signal between said devices.

19. The interference rejection method of claim 12, further comprising:

the second predetermined time is fixed in advance to a value satisfying the allowable range.

20. The interference rejection method of claim 12, further comprising:

the first predetermined time and the second predetermined time are calculated from the relational expression and in the ADSL the reference signal is shifted by the calculated first determined time and the second predetermined time.

21. The interference rejection method of claim 12, further comprising:

the calculated precision of the first predetermined time and the second predetermined time is increased by compensating for internal calculation delay, the working condition of communication devices, and the communication environment.

22. The interference rejection method according to claim 11, further comprising:

a relational expression between a communication device on the transmission side and a communication calculating an allowable range of the first predetermined time based on a device on the reception side where interference occurs most likely;

fixing a value which maximizes a margin of the allowable range and setting this value as the first predetermined time;

substituting the first predetermined time in all the relational expressions and in this state calculating an allowable range of the second predetermined time is calculated based on a relational expression between a communication device on the transmission side and a communication device on the reception side where interference occurs most likely; and fixing a value which maximizes the margin of the allowable range and setting this value as the second predetermined time.

23. The interference rejection method according to claim 22, further comprising:

determining a delay resulting from the internal processing in communication devices on the transmission side and the reception side;

adding predetermined conditions for protecting said other communication systems from interference more strictly are newly added to the relational expression; and calculating the first predetermined time and the second predetermined time based on the relational expression reflecting these conditions.

24. The interference rejection method of claim 11, further comprising:

the first predetermined time is calculated at a point where interference occurs most likely under conditions of maximum transmission line delay.

25. The interference rejection method of claim 24, further comprising:

said point is where the margin is smallest in the relational expression.

26. A communication device performing data communication using digital subscriber lines by transmitting a reference signal to a remote device to be communicated with, comprising:

means for delaying a reference signal by a first predetermined time to produce a first reference signal;

a transmitter for transmitting the first reference signal to the remote device; and a receiver for receiving data in synchronization with a second reference signal from the remote device, the second reference signal being produced by adjusting the delayed first reference signal by a second predetermined time.

27. The communication device according to claim 26, wherein:

the digital subscriber line is an Asymmetric Digital Subscriber Line (ADSL) being interfered with by an Integrated Services Digital Network (ISDN), and the communication device is an ADSL Transceiver Unit (ATU).

28. The communication device according to claim 27, wherein the receiver receives the second reference signal being adjusted at the remote device.

29. The communication device according to claim 27, wherein the reference signal is a TCM (Time Compression Multiplexing: time-shared transmission method)—ISDN timing reference.

30. The communication device according to claim 27, further comprising:

means for transmitting a Far End Cross Talk (FEXT) data symbol in synchronization with the first reference signal, and wherein the receiver for receiving the data as Near End Cross Talk (NEXT) data symbols.

31. The communication device according to claim 26, wherein the first predetermined time is a fixed value.

32. The communication device according to claim 26, wherein the second predetermined time is a fixed value.

33. A communication device performing data communication using digital subscriber lines by transmitting a reference signal to a remote device to be communicated with comprising:

a receiver for receiving a first reference signal from the remote device, the first reference signal being shifted from a reference signal indicating a transmission timing on another communication network;

means for adjusting the first reference signal by a predetermined time to produce a second reference signal; and a transmitter for transmitting data in synchronism with the second reference signal to the remote device.

34. The communication device according to claim 33, wherein:
- the digital subscriber line is an Asymmetric Digital Subscriber Line (ADSL) being interfered by an Integrated Services Digital Network (ISDN); and
- the communication device is an ADSL Transceiver Unit (ATU).

35. The communication device according to claim 34, wherein the reference signal is a (TCM) (Time Compression Multiplexing: time-shared transmission method)—ISDN timing reference.

36. The communication device according to claim 34, further comprising:
- means for receiving a Far End Cross Talk (FEXT) data symbol in synchronization with the first reference signal; and where
- the receiver receives the data as Near End Cross Talk (NEXT) data symbols.

37. The communication device according to claim 33, wherein the second predetermined time is a fixed value.

38. A communication method performing data communication using a digital subscriber line by transmitting a reference signal to a remote device to be communicated with comprising:
- delaying a reference signal by a first predetermined time to produce a first reference signal;
- transmitting the first reference signal to the remote device; and
- receiving data in synchronization with a second reference signal from the remote device, the second reference signal being produced by adjusting the delayed first reference signal by a second predetermined time.

39. The communication device according to claim 38, wherein:
- the digital subscriber line is an Asymmetric Digital Subscriber Line (ADSL) being interfered by an Integrated Services Digital Network (ISDN); and
- the reference signal is a TCM (Time Compression Multiplexing: time-shared transmission method)—ISDN timing reference.

40. The communication method according to claim 38, wherein the first predetermined time is a fixed value.

41. The communication device according to claim 38, wherein the second predetermined time is a fixed value.

42. A communication method performing data communication using a digital subscriber line by transmitting a reference signal to a remote device to be communicated with comprising:
- receiving a first reference signal from the remote device, the first reference signal being shifted from a reference signal indicating a transmission timing on another communication network;
- adjusting the first reference signal by a predetermined time to produce a second reference signal; and
- transmitting data in synchronization with the second reference signal to the remote device.

43. The communication device according to claim 42, wherein:
- the digital subscriber line is an Asymmetric Digital Subscriber Line (ADSL) being interfered by an Integrated Services Digital Network (ISDN); and
- the reference signal is a TCM (Time Compression Multiplexing: time-shared transmission method)—ISDN timing reference.

44. The communication device according to claim 43, wherein the predetermined time is a fixed value.

* * * * *